US008109393B2

United States Patent
Haeberlein

(10) Patent No.: US 8,109,393 B2
(45) Date of Patent: Feb. 7, 2012

(54) HOLDER AND MODULAR STACKING SYSTEM FOR SAFELY STORING AND/OR TRANSPORTING FRAMELESS PV MODULES OR OTHER FLAT, CUBOIDAL BODIES

(75) Inventor: Joachim Haeberlein, Pfungstadt (DE)

(73) Assignee: Ulla Haeberlein-Lehr, Pfungstadt (DE)

(*) Notice: Subject to any disclaimer, the term of this patent is extended or adjusted under 35 U.S.C. 154(b) by 0 days.

(21) Appl. No.: 12/917,938

(22) Filed: Nov. 2, 2010

(65) Prior Publication Data

US 2011/0108498 A1    May 12, 2011

(30) Foreign Application Priority Data

Nov. 6, 2009   (DE) .................. 20 2009 015 110 U

(51) Int. Cl.
   *A47G 19/08*   (2006.01)
(52) U.S. Cl. .................................. 211/41.14
(58) Field of Classification Search ............ 211/41.14, 211/183, 182, 194, 26; 206/454, 448; 248/220.1, 248/200, 345.1
   See application file for complete search history.

(56) References Cited

U.S. PATENT DOCUMENTS

| | | | | |
|---|---|---|---|---|
| 4,287,990 A * | 9/1981 | Kurick | .................. | 206/448 |
| 4,385,698 A * | 5/1983 | Goguen | .................. | 206/586 |
| 4,479,318 A * | 10/1984 | Russell | .................. | 40/788 |
| 4,518,085 A * | 5/1985 | Chisholm et al. | .................. | 206/454 |
| 5,518,118 A * | 5/1996 | Putz et al. | .................. | 206/449 |
| 5,715,956 A * | 2/1998 | Yoshida | .................. | 211/182 |
| 5,803,257 A * | 9/1998 | Bartholomew | .................. | 206/454 |
| 5,906,282 A * | 5/1999 | Aldrich et al. | .................. | 211/41.14 |
| 6,354,445 B1 * | 3/2002 | Pritz | .................. | 211/41.18 |
| 6,817,161 B1 * | 11/2004 | Wu et al. | .................. | 53/449 |
| 7,648,035 B2 * | 1/2010 | Edwards et al. | .................. | 211/41.14 |
| 7,712,240 B2 * | 5/2010 | Gipson | .................. | 40/783 |

* cited by examiner

*Primary Examiner* — Jennifer E. Novosad
(74) *Attorney, Agent, or Firm* — DeMont & Breyer, LLC

(57) ABSTRACT

The invention relates to a holder for safely storing and/or transporting frameless PV modules or other flat, cuboidal bodies, the size of which is defined by three sides and the thickness of which is defined by the shortest one of the three sides, wherein the holder comprises a base body made from a first material, which base body has a first and second side wall, at least one first and second support element and at least one first and second securing element, and further comprises a buffer structure made from a second material which is softer with respect to the first material and has an adhering effect.

14 Claims, 11 Drawing Sheets

HOLDER AND MODULAR STACKING SYSTEM FOR SAFELY STORING AND/OR TRANSPORTING FRAMELESS PV MODULES OR OTHER FLAT, CUBOIDAL BODIES

FIELD OF THE INVENTION

The present invention relates to a holder for safely storing or, respectively, safely transporting frameless photovoltaic modules or photovoltaics modules (PV modules) or other flat, cuboidal bodies, and a modular stacking system, comprising a plurality of such holders, wherein the modular stacking system is in particular suitable for stacking vertically aligned frameless PV modules or other flat, cuboidal bodies side by side. The other flat cuboidal bodies can involve, for example, glass panes, door leaves, tabletops, stone slabs and the like, for the safe storing and transporting of which the holder according to the invention can also be used.

BACKGROUND OF THE INVENTION

Thanks to a changed energy awareness of the population and supported by state funding initiatives, the use of renewable energy sources has gained increasing economic importance—this applies in particular for the field of photovoltaics, the conversion of sun light into electric power. In many places—not only in Germany—highly productive, state of the art factories were built in which today photovoltaics modules (PV modules) are manufactured as a mass produced article with to the most efficient methods in order to be shipped to all parts of Europe and the world.

In the standard version, PV modules consist of a single-pane safety glass on the front side, two fused layers of transparent laminating film between which the photovoltaics cells, in most cases made of silicon, and an electrical conductor system are embedded, and a special plastic film which seals the back side in a vapor diffusion tight manner. This is also referred to as glass/plastic module. In contrast, the so-called glass/glass modules are provided on the back side with a glass pane.

On the one hand, PV modules can be equipped with a frame made of a metal section, for example, a drawn aluminum section, which frame, for example, has a depth of 42 mm. On the other hand, frameless PV modules—in the version as glass/plastic module and also as glass/glass module—are also manufactured and shipped.

The size of PV standard modules is in most cases in the range between 0.8 m² and 1.6 m². The weight of framed modules lies mostly in the range between 14 and 28 kg and for unframed modules, depending on the size, between 5 and 20 kg, wherein glass/glass modules can be 60% heavier than glass/plastic modules.

It has already been recognized in the past that the considerations with respect to innovative rationalization must not be limited to manufacturing-related criteria, but must also include the areas storage, packaging, shipping and transport security.

For the transport to the customer, the PV modules were usually individually packaged in cardboard and stacked horizontally on top of one another on wooden pallets. To secure a stack of individual packages against slipping, the stack was connected to the pallet by means of tensioning straps.

However, this commonly used method of transport packaging of PV modules involved serious disadvantages. This includes an enormous amount of necessary packaging material, in particular cardboard packaging, and a significant amount of work for packing as well as unpacking of the individually cartoned PV modules at the end user. In addition, there was the thankless task to collect considerable amounts of cardboard boxes at the installation site and, if required, to shred and recycle the cardboard. Moreover, with this method, the PV modules could be stacked only up to a limited stacking height because the weight of the stacked modules adds up and is transferred onto the modules at the very bottom. In addition to this static load there is also a dynamic load during the transport, for example, by abrupt dropping with the forklift, acceleration forces, deceleration forces and centrifugal forces during truck transport and particularly by vibrations when driving over speed bumps and potholes. This can easily result in damage to the module or modules at the very bottom if the stack is too high.

Thus, packaged PV modules could be transported very rarely in stacking heights of more than 1 m, wherein, due to the risk of overloading the modules at the bottom, it was also not possible to stack two loaded pallets on top of each other so that often only a part of the available loading height of the cargo area of a truck could be utilized.

Another essential disadvantage of packaging PV modules with cardboard is that cardboard boxes are sensitive to moisture and can not be exposed to rain because they can not provide any stability or protection anymore in the wet state.

Due to these disadvantages, other solutions for stacking, storing and transporting PV modules have been developed.

For example, from the patent Abstracts of Japan Bd. 2000, No. 06, Sep. 22, 2000 and JP 2000 079961 A, Mar. 21, 2000, a modular plug-in system for safely storing and transporting of horizontally stacked photovoltaics modules (PV modules) is known. The system is configured as frame construction which is formed by four vertically running columns and horizontal struts connecting the latter. A plurality of frame units of the frame construction can be stacked on top of one another and can be connected by means of a plug-in connection. Each frame unit has four column sections and struts connecting the same. For plugging column sections together which are arranged on top of one another, the respective column section has a pin at the top and a recess at the bottom. The photovoltaic modules are stored in two of the four horizontal struts, namely in two struts arranged parallel to one another of the respective frame unit. For this, the two struts receive displacement parts on which the module rests. The respective column section of the column is configured as flat rod with formed ends.

Furthermore, from the European patent specification EP 1617485 B1 of the applicant, a modular plug-in system for safely storing and transporting horizontally stacked photovoltaic modules (PV modules) is known. This system is formed exclusively from individual, vertically arranged load-bearing columns which each consist of molding members which are arranged on top of one another and form the column when plugged together. On the side oriented towards the photovoltaic module, each of these molding members is equipped with a load-bearing carrier profile as support device for the photovoltaic module and has on the upper side and lower side, respectively, one or more pins or a key, and on the lower side and upper side, respectively, one or more open cavities for fittingly receiving the pin(s) or a groove for receiving the key.

However, in case of frameless PV modules, stacking horizontally aligned modules on top of one another is only suitable to a limited extent if at all. Specifically for relatively large-sized frameless PV modules, due to the effect of the high static and dynamic loads, there is a high risk of breakage. Therefore, for storing and transporting purposes, frameless PV modules are preferably stacked side by side with vertical alignment of the modules, in the same manner as this is common practice also for flat glasses.

For stacking flat glasses side by side, stationary as well as mobile shelf constructions are used, similar to the one illustrated in FIG. 17.

In principle, such shelf construction could also be used for storing and transporting frameless PV modules, but these shelf constructions could receive only a few modules. Moreover, it would not be possible to lean several PV modules against one another because normally each PV module has a projecting junction box on its backside. It is also to be considered that an empty shelf is still very bulky and heavy and thus requires a considerable effort during transportation.

Therefore it was or still is common practice to package also vertically aligned frameless PV modules in cardboard boxes for the storage and in particular for the transport. For this purpose, specially adapted cardboard boxes are available, for example, similar to the one shown in a simplified manner in FIG. 18. According to FIG. 18, such a cardboard box comprises a lower part for receiving a plurality of vertically aligned frameless PV modules, and an upper part which serves as cover. In order that the vertically aligned frameless PV modules do not fall over or collide with each other, at least the bottom of the lower part and the cover of the upper part have comb-like inserts, for example made of corrugated board, on the inner side facing the PV modules, wherein between each two tooth-like projections of a comb-like insert, a PV module is positioned. The tooth-like projections are wide enough that a contact of two PV modules, even considering the junction boxes projecting on the back side, is excluded. For a simpler handling, the whole cardboard box is placed on a transport pallet.

The company Eckpack-Service GmbH & Co. KG (http://www.eckpack.de) suggests to use a modular plug-in system, similar to the one of the European Patent Specification EP 1617485 B1 of the applicant, not only for stacking horizontally aligned PB modules on top of one another, but that with said system also stacks of PV modules can be generated which are vertically aligned and arranged side by side, as it is exemplary shown in the FIGS. 19, 20 and 21. For this, the individual PV modules are first provided at each of their four corners with one molding member of said modular plug-in system and are then stacked in horizontal alignment on top of one another before finally the whole stack is rotated so that the PV modules in the stack are now vertically aligned.

However, it is of disadvantage that a molding member of this modular plug-in system is adapted to framed PV modules and thus is configured to encompass the frame with its spring arm and to lock into place behind the frame (cf. FIGS. 19 and 21). However, such a molding member would have no possibility to engage on a frameless PV module so that this modular plug-in system can not be used for stacking vertically aligned frameless PV modules side by side.

Moreover, a disadvantage of the solution proposed by Eckpack is that a stack of PV modules, which are vertically aligned and arranged side by side, formed with said plug-in system is relatively instable if the stack is not held together by additional tensioning straps or bands (cf. FIG. 16) placed around it and not secured in particular along the stacking direction against slipping or falling apart.

Another disadvantage of the solution proposed by Eckpack with respect to frameless PV modules is that the corners and edges of each vertically aligned PV module within the stack, in particular the lower corner and edge areas on which the respective module rests and on which therefore the whole weight of the module acts, would be insufficiently protected against potential damage. This could be damages only on the surface such as, for example, scratches which occur due to vibrations during the transport if the corner and edge areas of the frameless PV modules enclosed by the molding members rub against the molding members. However, there would also be the risk that due to shocks during the transport, broken particles chip off or splinter off.

Therefore, as a result of the considerations explained herein, an object to be solved is to provide a system for safely storing and transporting frameless PV modules whilst avoiding at least one of the described disadvantages.

SUMMARY OF THE INVENTION

A holder for safely storing and/or transporting frameless PV modules is provided, wherein, however, said holder is also suitable for other flat, cuboidal bodies such as door leaves, tabletops, furniture panels or stone slabs the size of which is defined by three sides and the thickness of which is defined by the shortest one of the three sides. Such a holder has a base body made of a first material with a first side wall which is connected along an intersection line to a second side wall at a connection angle of 90 degrees so that the side walls are connected to one another in a L-shaped manner and a wedge-like shape of the base body is defined. Each of the side walls has an inner surface which each extends along the intersection line between a first border perpendicular to the interface and a second border perpendicular to the intersection line. Between these inner surfaces too, a right angle is formed. Moreover, each of the side walls has a first abutting surface which, together with the inner surface, forms a first edge at the first border, and a second abutting surface which, together with the inner surface, forms a second edge at the second border. The base body further comprises at least one first support element and spaced apart therefrom along the intersection line, at least one second support element, wherein the support elements are integrally formed on the inner surface of at least one of the side walls, and wherein a gap is formed by the at least one first support element and the at least one second support element and a first inner surface region which extends between the first and second support elements over the inner surface of at least one of the side walls. Furthermore, the base body comprises at least one first and at least one second securing element, wherein the at least one first securing element acts on the side of the first abutting surfaces, and wherein the at least one second securing element is formed to fit on the opposite side to the at least one first securing element and acts on the side of the second abutting surfaces. Such a holder according to the invention can be detachably connected on the side of the first abutting surfaces and on the side of the second abutting surfaces in each case to a further correspondingly aligned similar holder in such a manner that the intersection lines of the holders lie in a common axis, wherein the at least one first and the at least one second securing elements are configured according to the invention in such a manner that they secure, in interaction with each of the oppositely fitting securing elements of the further holder, the connected holders against slipping transverse to the common axis and/or against slipping along the common axis. In addition, the holder according to the invention comprises a buffer structure made of a second material which is softer with respect to the first material and which has an adhering effect, wherein the buffer structure is applied on the first inner surface region and in each case on that surface of the at least one first and the at least one second support element which faces the gap. Here, the gap is configured for receiving and supporting a corner region section of a PV module or another flat, cuboidal body to be stored and/or to be transported which, with the side defining its thickness, is aligned parallel to the intersection line, and the buffer structure is configured to cushion and fix the corner region section of the PV module or the flat, cuboidal body in the gap, prevented that the thickness of the PV module or the flat, cuboidal body corresponds substantially to the width of the gap.

On the other hand, according to the invention, a modular stacking system for safely storing and/or transporting frameless PV modules or other flat, cuboidal bodies is provided. Such a stacking system comprises at least one first, at least one second, at least one third and at least one fourth holder according to the invention, wherein the second holder with respect to the first holder, the third holder with respect to the second holder, and the fourth holder with respect to the third holder are arrangable in each case such that they are rotated by 90 degrees about the axis of their intersection line for receiving in each case one section of one of the four corner regions of a PV module or another flat, cuboidal body in the gap of each of the holders. Moreover, the at least one first, the at least one second, the at least one third and the at least one fourth holders can be detachably connected to correspondingly aligned, further similar first, second, third and fourth holders, namely in such a manner that the intersection lines of all first, second, third and fourth holders each lie in one common axis and that each of the connected holders are secured by the interaction of their securing elements against a slipping transverse to the common axis and/or against a slipping along the common axis of the intersection lines.

The first material, that is, the material of the base body, is preferably a hard plastic or a metal, in particular die-cast aluminum. The second material, thus the buffer structure, is advantageously a soft plastic.

Thanks to the buffer structure in the gap of each holder according to the invention, the corner and edge regions of the PV modules or the other flat, cuboidal bodies are much better protected against damage when vertically aligned within a stack formed with the modular stacking system, and not only against damage on the surface such as scratches, but also against chipping or splintering of broken particles. On the one hand, the buffer structure fixes the PV modules in the gap, that is, it avoids a play between the PV module and the holder and a rubbing of the PV module against the holder. On the other hand, the buffer structure cushions the PV module in the gap, that is, it absorbs shocks which can be caused, for example, by abrupt dropping by the forklift or during the truck transportation by vibrations when driving over speed bumps and potholes, and thus reduces the dynamic load acting on the PV module.

Depending on the embodiment, the buffer structure as a whole can have a uniform thickness or can have a different thickness depending on the application location. For example, the buffer structure can have a different thickness at a position where it is applied on the first inner surface region compared to a position where it is applied on the surfaces of the support elements. However, the buffer structure as a whole or in part can also have a corrugated surface. Another possibility is that the thickness of the buffer structure decreases or increases in one direction.

According to a particularly preferred embodiment, initially, the buffer structure is thinner at the entrance opening and the thickness increases in the direction towards the first inner surface region. Because the width of the gap only gradually becomes narrower, this results in an advantageous funnel effect which makes inserting a corner region section, for example of a PV module, into the gap of a holder or attaching a holder with the gap onto a corner region of a PV module significantly easier.

Apart from cushioning and fixing a corner region section of a frameless PV module or another flat, cuboidal body in the gap of a holder according to the invention, the buffer structure with the adhering effect of its material provides also that the holder, even without a latching mechanism, has a firm or at least a vibration-resistant grip on the relatively smooth surface of a PV module or a glass pane, stone slab or the like, and can only be detached again from the corner region section of the PV module or the flat, cuboidal body with an adequately higher pulling force. Therefore, the holder according to the invention offers a further significant advantage over the prior art.

With respect to the application method of the buffer structure, preferably such embodiments are provided for which the buffer structure is injection-molded in each case on that surface of the at least one first support element and the at least one second support element which faces the gap and on the first inner surface region. In principle, however, also possible are embodiments in which the buffer structure initially is a separate body which then can be applied in such a manner onto the first inner surface region and in each case on that surface of the at least one first support element and the at least one second support element which faces the gap that said body can be inserted, glued, latched or clipped into the gap surrounded by these surfaces.

The securing elements are preferably configured in such a manner that the at least one first securing element and the at least one second securing element are formed as pin or key and that the at least one second securing element and the at least one first securing element, respectively, are formed as open cavity for fittingly receiving the pin of a correspondingly aligned further similar holder or as groove for fittingly receiving the key of a correspondingly aligned further similar holder.

Preferably, the pin or the key is formed on at least one first abutting surface or, respectively, on at least one second abutting surface and the open cavity which is fittingly formed on the opposite side or the groove which is fittingly formed on the opposite side is located on at least one second abutting surface or, respectively, on at least one first abutting surface. In the case of interconnected holders of this embodiment, one pin or, respectively, one key of the one holder is fittingly inserted in one open cavity or, respectively, one groove of the other holder. The holders connected to one another through this plug-in connection are secured by their securing elements against slipping transverse to the common axis of the intersection lines.

According to another particularly preferred embodiment, the key is integrally formed along at least one of the first edges or, respectively, along at least one of the second edges on at least one of the inner surfaces, and the fitting groove on the opposite side is formed by a protrusion which is integrally formed along at least one of the second edges or, respectively, along at least one of the first edges on at least one of the inner surfaces. In case of interconnected holders of said advantageous embodiment, the protrusion of the one holder then engages behind the key of the other holder in such a manner that the key is seated in a positive locking manner in the groove formed by the protrusion. Holders connected to one another in this manner are secured through their securing elements against slipping along the common axis of their intersection lines. In order to be able to disengage the holders again from each other, at least one movement of the holders relative to each other is necessary, wherein the movement is not to be carried out along the common axis of the intersection lines. Already the adhering effect of the buffer structure in the gap of each holder contributes to the fact that a slipping, for example of the holders connected to each other within a stack, transverse to the common axis of the intersection lines is at least made difficult once in each of the gaps of the holders, one corner region section of, for example, PV modules stacked side by side is placed.

A stack of frameless PV modules arranged side by side in vertical alignment and formed by means of the modular stacking system according to the invention using holders with such securing elements is secured in such a stable manner and against falling apart or, respectively, slipping along the stacking direction that it does not have to be held together, at least not during storage, by additional tensioning straps or bands applied around the stack.

In order to secure interconnected holders, in addition to the previously described effect of the buffer structure, also against a slipping transverse to the common axis of the intersection axis, in a particularly preferred embodiment of the holder, the first or a further first securing element and the second or a further second securing element are configured in an adequately suitable manner. Thus, the first or a further first securing element is formed, for example, as a passage which extends transverse to the intersection line of the two connected side walls, along the angle bisector of the connection angle and through the side walls, and which has an edge in its interior at which edge the inner dimension of the passage widens. The second or a further second securing element is then, for example, a latch nose which, when the holders are connected to each other, engages with the passage of the further holder and latches behind the edge inside the passage. In order to be able to disengage the holders interconnected in this manner again, a finger or a suitable tool has to be inserted from outside into the passage to bend the latch nose back.

With respect to the securing elements it should be mentioned that, as long as the first and second securing elements are fittingly formed on opposite sides, it is substantially freely determinable if, for example, a securing element configured as pin or key acts on the side of the first abutting surfaces and, correspondingly, a securing element configured as open cavity or groove acts on the side of the second abutting surfaces or vice versa.

According to a further embodiment, the base body of the holder comprises further first and/or second support elements. If a plurality of first support elements exists, then they are integrally formed on the one or the other inner surface of the side walls in such a manner that they lie in a common first plane which extends transverse to the intersection line and between the inner surfaces of the side walls. Accordingly, the individual second support elements, if a plurality of them exists, are integrally formed on the one or the other inner surface of the side walls in such a manner that they lie in a common second plane which extends transverse to the intersection line and between the inner surfaces of the side walls, wherein the second plane is spaced apart from the first plane or, respectively, the first support element along the intersection line. Thus, all first and second support elements are jointly involved in the formation of the gap for receiving a corner region section of a PV module.

Preferably, at least one of the support elements is integrally formed on the inner surfaces of both side walls to support the side walls of the base body of the holder with respect to each other and thus to increase the stability of the holder itself.

Advantageously, the first borders are spaced apart along the intersection section line from the second borders of the inner surfaces of the side walls in such a manner that the inner surfaces are wider than the width of the gap for receiving a corner region section of a PV module so that the inner surfaces have a second inner surface region outside of the gap. A holder configured in such a manner is also suitable for a PV module or another flat, cuboidal body which fits with its corner region section in the gap, but which, at a region other than one of its corner regions, has a projection which extends substantially parallel to the intersection line but not beyond the second inner surface region. In case of a PV module, such a projection can be, for example, a junction box which is located on the back side of the PV module.

Moreover, it is of course possible within the context of the invention that, if the inner surfaces are wider than the width of the gap for receiving a corner region section of a PV module, the inner surfaces have a second inner surface region on the one side outside of the gap and an additional third inner surface region on the other side outside of the gap so that a holder configured in such a manner can also be used for flat, cuboidal bodies which, on their front and back sides, have a number of projections which extend substantially parallel to the intersection line.

The suitability of a holder for a PV module or another flat, cuboidal body with a certain thickness depends in each case, on the one hand, on the gap width of the holder and, on the other, on whether the inner surfaces of the side walls and thus the side walls themselves are wide enough that potentially existing projections on the front and/or back side of the PV module or the flat, cuboidal body do not protrude the walls.

An advantageous aspect of the buffer structure is, in particular if it forms a separate body, that the typically fixed width of the gap of a holder can be varied through the thickness of the applied buffer structure by at least a few millimeters. In this manner it is possible, for example during the production of the holders, to achieve in a simple manner a variance in the gap width by injection-molding buffer structures with different thicknesses onto the surfaces bordering the gap of the same type of base body. With a buffer structure as separate body it is possible in a particularly practical manner to adjust the gap width of the base body of a holder even after completion of manufacturing and preferably also prior to each further use by simply inserting, clipping or latching a buffer structure with the respective required thickness into the gap of the base body of a holder.

In addition, in case of a holder, the inner surfaces of which are wider than the gap for receiving a corner region section of a PV module and thus have a second or, respectively, third inner surface region outside of the gap, at least one third support element can be present, wherein the latter is spaced apart along the intersection line from the at least one first and the at least one second support element and is integrally formed in the region of the second or, respectively, third inner surface regions onto the inner surfaces of both side walls so as to support the side walls of the base body of the holder with respect to each other and thus to further stabilize the holder itself.

Preferably, a support element which is integrally formed on the inner surfaces of both side walls forms a continuously closed or partially open triangular wall which extends between the inner surfaces of the side walls.

According to a particularly preferred embodiment, at least one of the side walls of the base body of the holder has at least one, in particular round, cut-out between the first abutting surface and the second abutting surface. A holder according to this embodiment, apart from being used for storing and transporting PV modules, can also be used for the assembly of PV modules at the installation site because, for example, it allows to screw the holder directly to an underlayment. Thus, a PV module provided on each of its corners with one such holder can be mounted in a simple manner, for example, on a facade or on a roof, wherein advantageously, the same holders in which the PV module has been retained in the stack during the transport can be used for mounting.

Additionally or alternatively to the at least one cut-out, preferably at least one of the side walls of the base body of the holder has a rectangular or trapezoidal recess in at least one of its abutting surfaces, in particular on its second abutting surface. A holder according to this embodiment, apart from being used for storing and transporting PV modules, can also be used for the assembly of PV modules at the installation site, wherein the holder allows an indirect screwing or clamping to an underlayment by means of a clamping device such as a Z-bracket or Z-section, respectively, or a hat profile. For mounting the holder, for example, a Z-section is screwed with its lower flange or lower bent edge to a carrier profile, wherein the upper flange or the upper bent edge encompasses the abutting surface at the recess and presses the holder against the carrier profile. Since the contour of the recess corresponds substantially to the contour of the flange, the recess facilitates, on the one hand, the correct positioning of clamping device and holder during the mounting and, on the other, makes a slipping of the holder after the mounting difficult.

Provided that, advantageously, the holder has a cut-out between the abutting surfaces as well as a recess in one abutting surface in at least one of the side walls of the base body, it thus allows a mounting selectively by screwing or clamping.

Provided that the cut-out is particularly advantageously located in the region of the recess at an abutting surface then, in addition, a particularly slip-resistant clamping of the holder to an underlayment is possible. This simply requires a clamping device, the upper flange of which, which encompasses the abutting surface of the holder at the recess, has a nose on its lower side, which nose engages fittingly with the cut-out.

Further features and/or advantages of the invention are illustrated in the following description which relates in particular to the figures, and in the figures themselves, wherein it has to be noted that all individual features and all combinations of individual features represent further inventive configurations.

BRIEF DESCRIPTION OF THE DRAWINGS

The invention is illustrated in the FIGS. 1 to 16 in a plurality of exemplary embodiments without being limited to it. The FIGS. 17 to 21 show solutions according to the prior art. In the figures.

DETAILED DESCRIPTION

Figure 1:
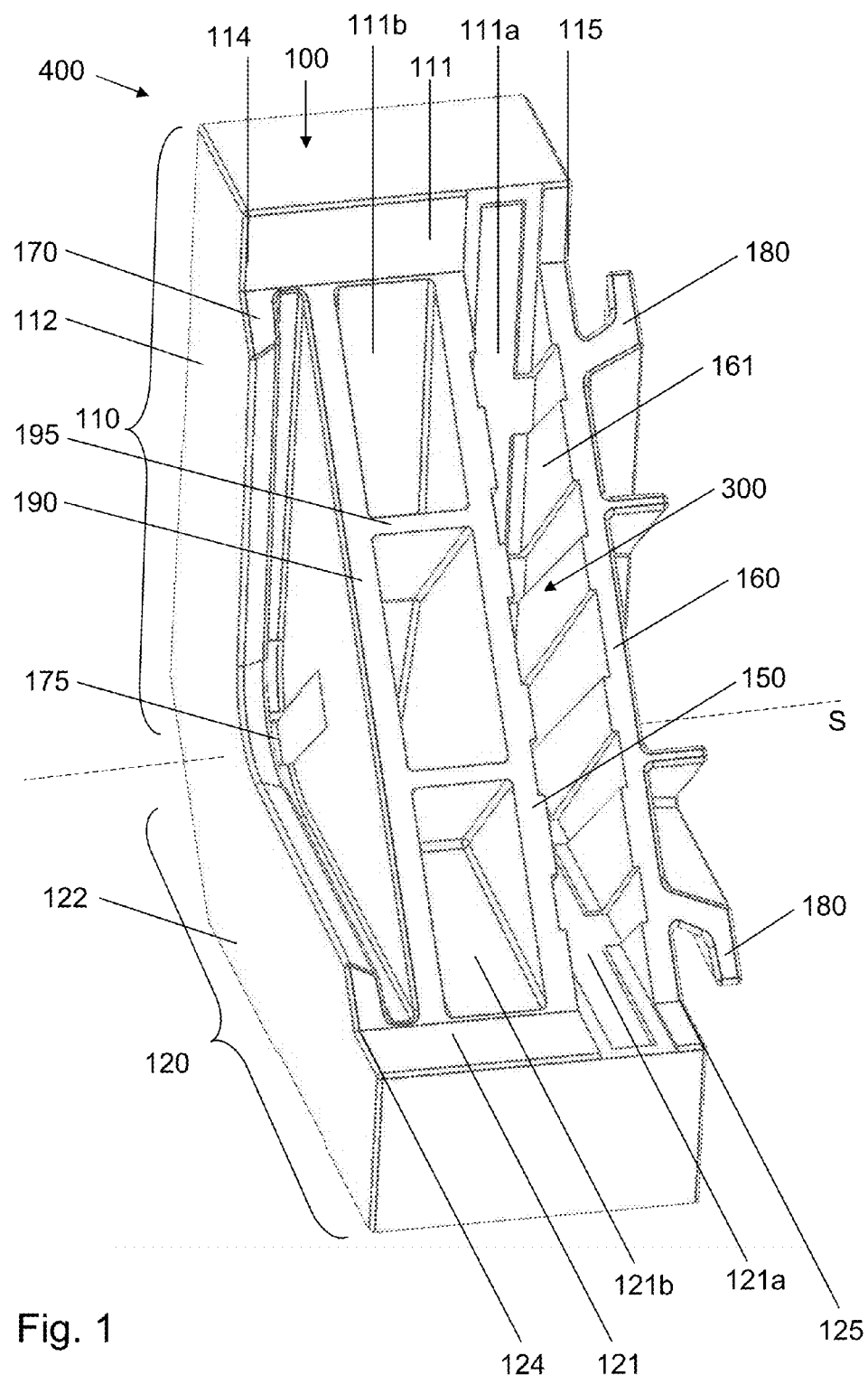
FIG. 1: shows the base body of a first embodiment of the holder in a spatial view at an angle onto the first abutting surfaces and the inner surfaces of the two side walls.

FIG. 1 shows the base body 100 of a first embodiment of the holder 400 for safely storing and/or transporting framed and unframed PV modules or other bodies which are flat and cuboidal and the size of which is defined by three sides such as, for example, flat glasses, door leaves, tabletops, furniture panels or stone slabs. According to the intelligibility of this application, the thickness of said flat, cuboidal bodies is defined by their shortest side.

The base body 100 has a first side wall 110 which is connected along an intersection line S, which is indicated in the figures as dashed line, to a second side wall 120 at a connection angle of 90 degrees. Thus, the substantially wedge-like shape of the base body 100 is defined by these two side walls 110, 120 which are connected to each other in a L-shaped manner.

The inner surfaces 111 of the side wall 110 and the inner surface 121 of the side wall 120 each extend along the intersection line S between a first border 114 or, respectively, 124 perpendicular to the intersection line S and a second border 115 or, respectively, 125 perpendicular to the intersection line S, wherein here too a right angle exists between the inner surfaces 111 and 121.

Furthermore, the side walls 110 and 120 have first abutting surfaces 112 and 122 which, at the first borders 114 and 124, form a first edge with the inner surfaces 111 and 121. At the second borders 115 and 125, the inner surfaces 111 and 121 form a second edge with the second abutting surfaces 113 and 123 of the side walls 110 and 120, wherein due to the perspective in FIG. 1, the second abutting surfaces are not visible in FIG. 1 but in FIG. 4.

The base body 100 comprises further a first support element 150 and spaced apart therefrom along the intersection line S, a second support element 160. In this embodiment of the holder 400, both support elements 150 and 160 are integrally formed on both inner surfaces 111 and 121 and each of them form a closed triangular wall.

On the one hand, the first support element 150 and the second support element 160 together with the first inner surface region 111*a*, which extends between them across the inner surfaces 111 and 121, form a gap 300 for receiving and supporting a corner region section of a PV module or another flat, cuboidal body to be stored and/or to be transported. For this purpose and with the side defining its thickness, a PV module or flat, cuboidal body is to be aligned parallel to the intersection line S, wherein by the width of the gap 300, thus the distance between the first and the second support element 150 and 160, the maximum thickness of a receivable body is predetermined.

On the other hand, in this embodiment of the holder 400, the support elements 150 and 160 serve also for supporting the side walls 110 and 120 and thus for further stabilization of the holder 400.

Figure 2:
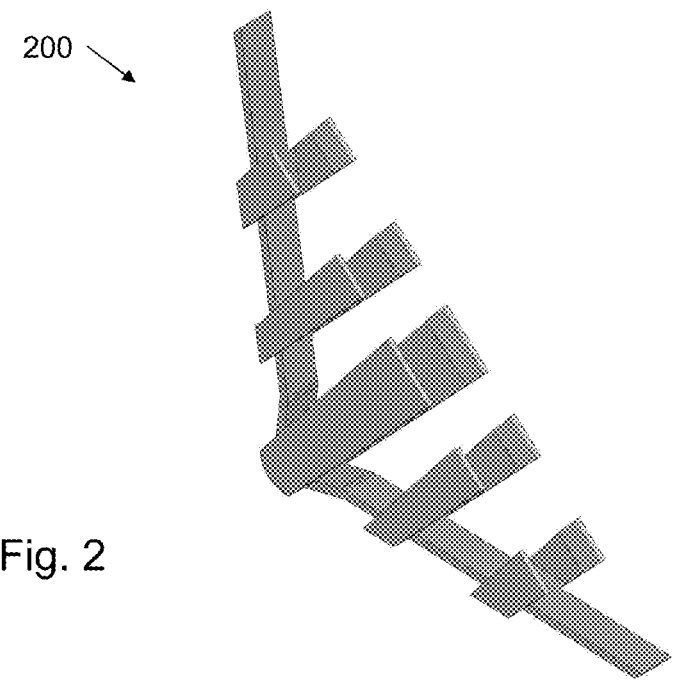
FIG. 2: shows the buffer structure of the holder of the first embodiment according to FIG. 1 in a spatial view.

FIG. 1 shows only the base body 100 of a holder 400 of the first embodiment. However, the base body according to FIG. 1 is suitably adapted for applying a buffer structure, as shown in FIG. 2, onto those surfaces of the first and second support elements 150, 160 which enclose the gap 300, as well as onto the first inner surface region 111*a*, 121*a*. Therefore, the surfaces enclosing the gap 300 have recesses which correspond to the shape of the buffer structure according to FIG. 2 and by means of which such a buffer structure, after it has been applied, has a better support in the gap 300. The whole holder of this embodiment with the base body and the applied buffer structure is shown in the FIGS. 4, 5 and 8.

However, it should be noted that also other embodiments of the holder 400 are provided, wherein depending on type and shape of the buffer structure to be applied, the recesses in the surfaces enclosing the gap 300 can accordingly be formed different than in FIG. 1. Furthermore, embodiments of the holder 400 are possible in which the surfaces enclosing the gap 300 do not have any recesses but are still suitable for applying a buffer structure. The buffer structure is illustrated in more detail hereinafter in connection with FIG. 2 and further figures.

Moreover, in an embodiment of the holder 400 different from the one shown in FIG. 1, instead of being formed as triangular wall, the first and/or the second support element 150 or, respectively, 160 can also be formed as projection in the form of a continuous key which runs perpendicular to the intersection line S along the inner surfaces 111 and 121. As an alternative to a continuous key, a number of pin-like projections can be integrally formed on the inner surface 111 and/or 121 so that there are a plurality of first support elements 150 and/or a plurality of second support elements 160 which each lie in a common first or, respectively, second plane which extends transverse to the intersection line S.

Figure 3:
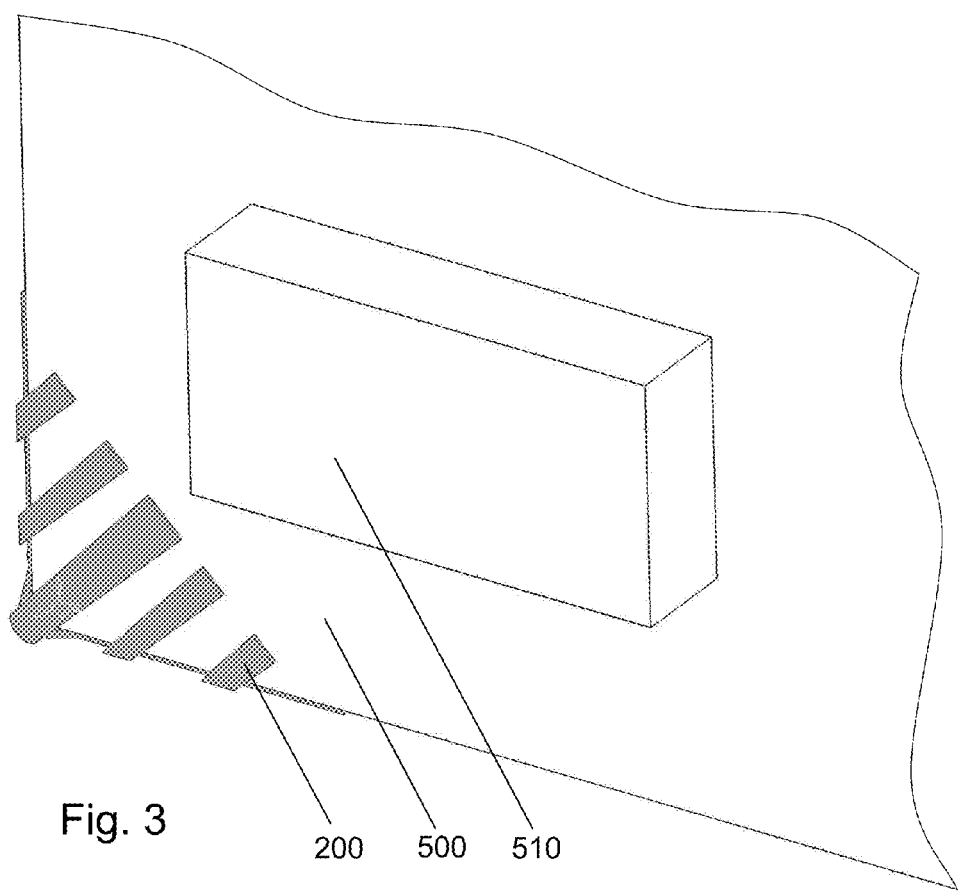
FIG. 3: shows the buffer structure according to FIG. 2 in a spatial view, the buffer structure enclosing a corner region section of a frameless PV module.

As is further shown in FIG. 1, the side walls 110 and 120 are significantly wider than the width of gap 300 so that the inner surfaces 111 and 121 also have a second inner surface region 111*b*, 121*b* next to the first support element 150 and outside of the gap 300. This is necessary, for example, to be able to use the holder for PV modules which usually have junction box projecting from the back side of the module, as this is shown in FIG. 3.

In this embodiment of the holder 400, the base body 100 comprises, in addition to the support elements 150 and 160, a third support element 190 which is spaced apart along the intersection line S from the first support element 150 and, in the region of the second inner surface region 111*b*, 121*b*, is also integrally formed on the two inner surfaces 111 and 121. The third support element 190 too forms a closed triangular wall and, together with the stiffening ribs 195 which are arranged between the third and the first support element, contributes again to the stabilization of the holder 400.

Furthermore, the base body 100 comprises a first and a second securing element 170 and 180. The first securing element 170 is integrally formed along the first borders 114 and 124 on the inner surfaces 111 and 121 as a continuous key having a trapezoidal cross-section in such a manner that it is flush with the first abutting surfaces 112 and 122. The second securing element 180 is integrally formed along the second borders 115 and 125 on the inner surfaces 111 and 121 as a continuous protrusion which forms a groove corresponding to the trapezoidal cross-section of the key 170, wherein the protrusion 180 protrudes the two abutting surfaces 113 and 123 as it is shown more clearly in FIG. 4. Since the second support element 160 in the embodiment of the holder shown in FIG. 1 and also the second securing element 180 are integrally formed on the inner surfaces 111 and 121 directly along the second borders 115 and 125, the second support element 160 and the second securing element 180 have a common attachment base on the inner surfaces 111 and 121.

In addition to the securing elements 170 and 180, the base body 100 of the holder 400 of the embodiment according to FIG. 1 has a further first securing element 175 and a further second securing element 185, wherein the latter is not visible in FIG. 1 due to the perspective and will be described hereinafter in connection with FIG. 4 and further figures. The further first securing element 175 forms a passage which runs directly behind the key 170 along the angle bisector of the connection angle of the side walls 110 and 120 through the side walls and which has an edge in its interior at which edge its inside dimension widens.

The interaction of the securing elements of a plurality of connected holders will be discussed later in more detail in connection with the FIGS. 5, 6 and 7.

With respect to FIG. 1 it should be mentioned that in other embodiments of the holder 400, the securing elements can also be formed in a manner which is different from what is shown here. However, the configuration of the first securing element 170 as a continuous key and the configuration of the second securing element 180 as continuous protrusion represent a variant which is to be considered as particularly stable.

FIG. 2 shows an exemplary configuration of the buffer structure 200 which, in this case, is provided for the holder 400 of the first embodiment according to FIG. 1. For a better understanding of its configuration, the buffer structure 200 in FIG. 2 and also in FIG. 3 is illustrated without the base body 100 of the holder 400, although the buffer structure according to this embodiment does not represent a separate body but is fixedly connected as injection-molded plastic to the base body 100 of the holder 400. Here, the buffer structure 200 is made of a material which is softer than the material of the base body 100 according to FIG. 1. The buffer structure 200 and also the base body 100 of the holder 400 of this first embodiment are plastic injection-molded parts; however, the plastic of the buffer structure 200 is different from and in particular softer than the one of the base body 100. In another embodiment of the holder 400, the base body 100 can also be made from a metal such as, for example, die-cast aluminum.

However, principally, other embodiments of the holder 400 are also possible such that the buffer structure 200 is initially formed as a body which is separate from the base body 100 and which then, for example, can be glued, clipped or latched into the gap 300 of the base body 100.

As it is apparent from FIG. 2, the buffer structure 200 has a L-shaped strip angled at an interior angle of 90 degrees and ten more strips which are opposing each other in pairs at 5 positions along the course of the angled strip and which are integrally formed on the borders of the latter and extend parallel to the angle bisector of the interior angle. Two pairs of strips are integrally formed in each case on the one or, respectively, the other of the legs with identical length of the angled strip while another pair of strips is attached directly at the corner points of the edge at which the L-shaped strip is angled.

When taking a closer look at the buffer structure 200 according to FIG. 2 it is apparent, however, that the two otherwise straight legs of the angled strip form a curvature rather than an edge in the region of the vertex of the interior angle, which curvature extends behind the vertex. The resulting advantage is made clear by FIG. 3.

The strips of each of the five pairs have a chamfer on the opposing surfaces of their free ends, which chamfer results in a reduced thickness of the buffer structure 200 at these regions so that between the free ends of the strips of a pair, a slightly greater distance exists than between the ends with which the strips are integrally formed on the borders of the angled strip. The resulting advantage is made clear by FIG. 4 and further figures.

FIG. 3 shows the buffer structure 200 according to FIG. 2 with the buffer structure enclosing a corner region of a frameless PV module 500 which is indicated only schematically with its junction box 510. Since the PV module 500 is not thicker than the previously described distance between the strips of each of the five pairs, the corner region of the module 500 is fittingly seated between the five pairs of strips and the L-shaped strip of the buffer structure 200. The L-shaped strip rests on the side faces determining the thickness of the PV module, but due to the previously described curvature, does not touch the edge of these two side faces. Due to the free space remaining between the edge and the curvature, the edge is particularly well protected against damage.

Figure 4:
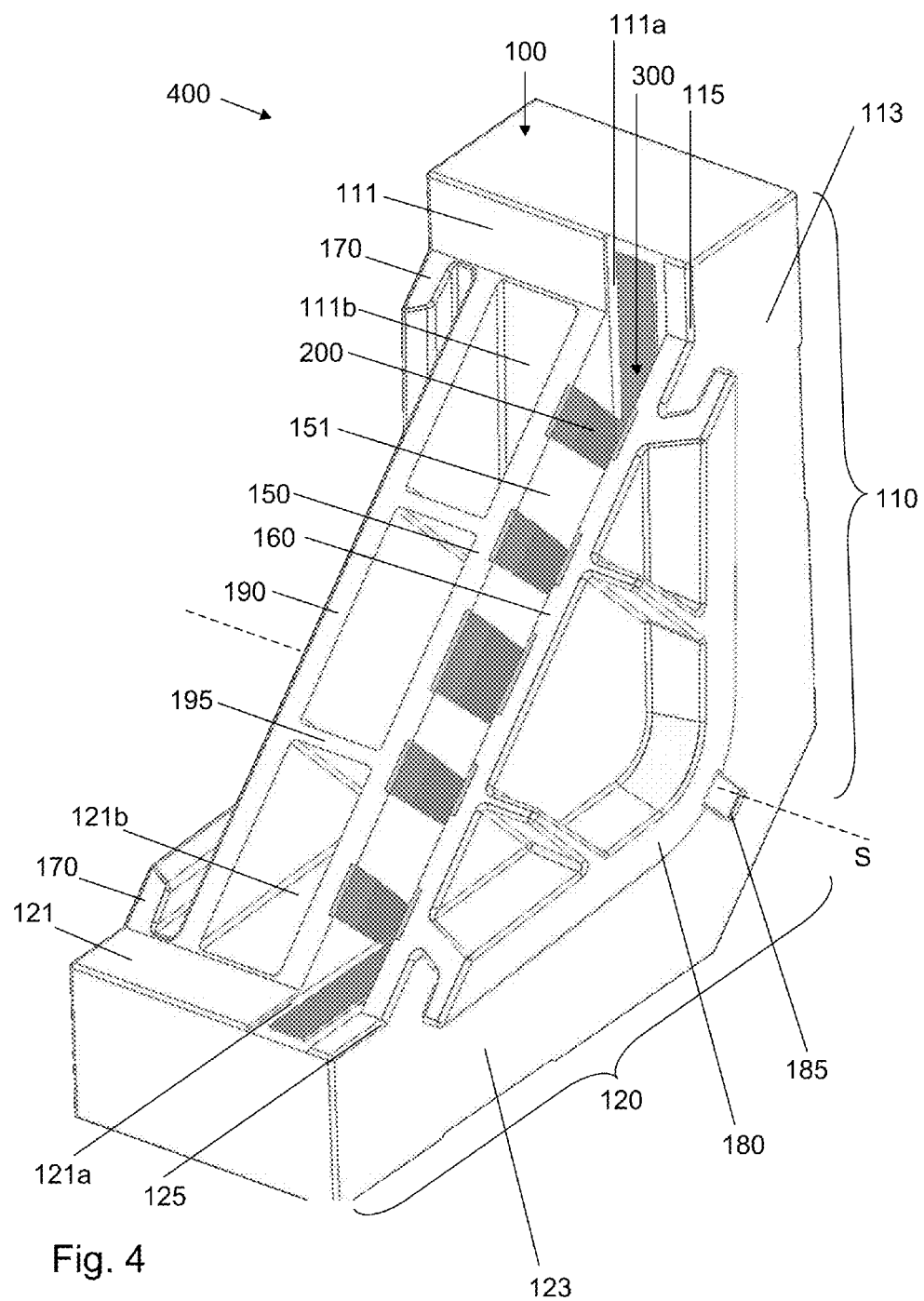
FIG. 4: shows the holder of the first embodiment with the base body according to FIG. 1 and the buffer structure according to FIG. 2 in a spatial view at an angle onto the second abutting surfaces and the inner surfaces of the two side walls.

FIG. 4 shows the holder 400 of the first embodiment; however, this time with the base body 100 according to Figure as well as with the buffer structure 200 according to FIG. 2. Also, due to the perspective view on the holder 400, which is different with respect to FIG. 1, not only the second abutting surfaces 113 and 123 of the side walls 110 and 120 of the base body are visible, but also the two second securing elements 180 and 185.

As already described in connection with FIG. 1, the second securing element 180 is formed as a protrusion forming a groove, which protrusion has a common attachment base with the second support element 160 and is integrally formed along the second borders 115 and 125 onto the inner surfaces 111 and 121 and protrudes the second abutting surfaces 113 and 123. Where the inner surfaces 111 and 121 meet each other in a right angle, consequently, the protrusion 180 is also angled accordingly. At this corner which is rounded, however, at the outermost border of the protrusion 180, the second securing element 185 in the form of a latching nose or latching clip is attached which, for example, points along the angle bisector towards the outer surfaces 116 and 126 of the side walls 110 and 120, which are shown, for example, in the FIGS. 6 and 7.

For stabilization of the protrusion 180, the same is supported with two stiffening ribs on the triangular wall of the second support element 160, as it is shown in FIG. 4.

On those surfaces of the first and the second support element 150, 160 which enclose the gap 300, and on the first inner surface regions 111a, 121a, the buffer structure 200 according to FIG. 2 is now applied, wherein the base body 100 of the holder 400 of the first embodiment is suitably adapted for said buffer structure. Thus, the buffer structure 200 is well supported in the recesses which correspond to the shape of the buffer structure and which are described in connection with FIG. 1. It is to be understood that the buffer structure 200, in order to be able to cushion and fix a corner region of a PV module 500 in the gap 300, is thick enough that it protrudes out of the recesses and beyond the surfaces bordering the gap 300. Only directly at the entrance of the gap, the chamfered and thus thinner free ends of the five pairs of strips of the buffer structure 200 are flush with the wall surfaces of the support elements 150 and 160 not only with respect to the length but also with respect to the thickness. The width of the gap 300 thus is not already reduced directly at its entrance by the buffer structure 200, but narrows increasingly until the buffer structure has reached its full thickness. Therefore, the buffer structure 200 offers in addition a kind of a funnel effect when inserting a corner region section of a PV module 500 into the gap 300 or, respectively, when attaching a holder 400 with the gap 300 onto a corner region of a PV module.

In this embodiment of the holder 400, the buffer structure 200 is applied in such a manner that it is injection-molded exactly at the location where the surfaces 151, 161, 111a and 121a enclosing the gap 300 have the previously described recesses and therefore is firmly connected to the base body 100.

As already mentioned, according to other embodiments of the holder 400, the buffer structure 200 can initially be a body which is separate from the base body 100 and which is then glued onto the surfaces 151, 161, 111a and 121a enclosing the gap 300, and/or can be clipped or latched into the gap 300.

Apart from the different ways of applying a buffer structure, other shapes or patterns of a buffer structure, which are different from the strip shape shown in the figures, are of course also possible. Thus, for example, a buffer structure can be injection-molded in the form of a plurality of round knobs or web-like onto each of those surfaces of the at least one first and at least one second support elements 150 and 160 which face towards the gap 300, as well as onto the first inner surface region 111a, 121a.

Figure 5:
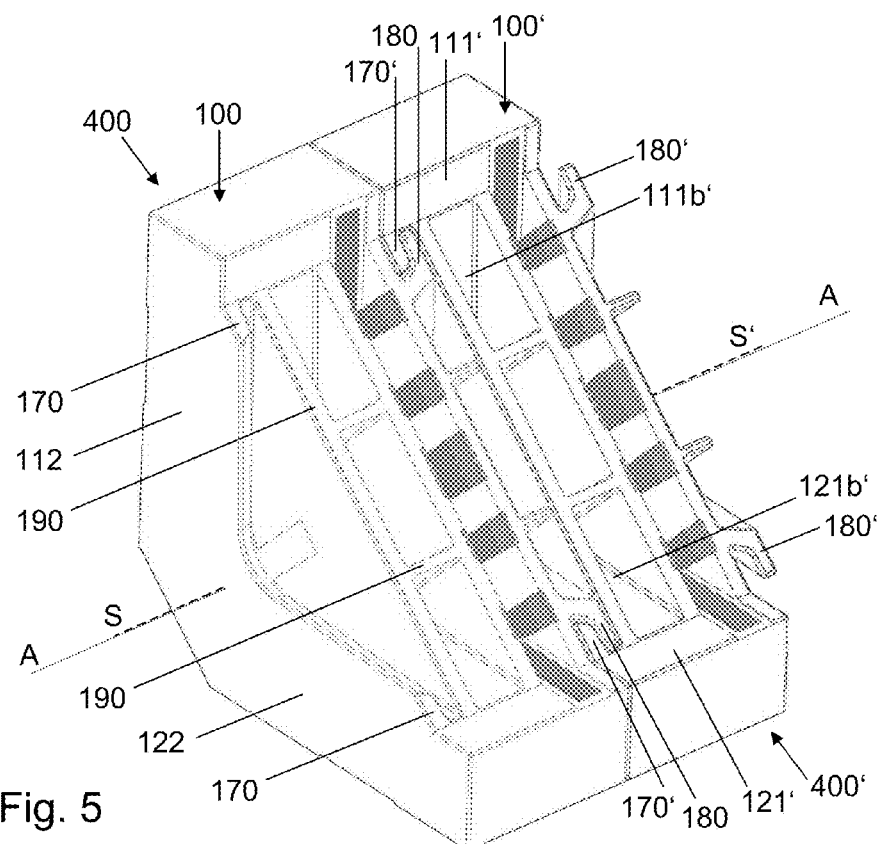
FIG. 5: shows an arrangement of two interconnected holders of the first embodiment according to FIG. 4 in a spatial view at an angle onto the first abutting surfaces of the side walls of the one holder.

FIG. 5 shows an arrangement of two interconnected holders 400 and 400' of the first embodiment according to FIG. 4 with a base body 100 and, respectively, 100' and a buffer structure 200 and, respectively, 200'. Thus, FIG. 5 shows that the second abutting surfaces of the holder 400 contact the first abutting surfaces of the holder 400' and that the protrusion 180 of the holder 400 engages behind the key 170' of the holder 400' in such a manner that the key 170 fits accurately in the groove formed by the protrusion 180. Thereby, the holders are secured against slipping along the common axis A in which the intersection lines S and S' of the sides of the holders lie.

A holder comprising only securing elements which alone are able to prevent a slipping along the common axis of the intersection lines when the holder is connected to a further holder already represents a subject matter according to the invention. However, the holders shown in FIG. 5 belong to a preferred embodiment which, as already mentioned, comprises further securing elements.

When taking a closer look at the two interconnected holders 400 and 400' according to FIG. 5 it is apparent that—apart from the adhering effect of the buffer structure 200—the securing elements 180 and 170' alone can not prevent that, for example, the holder 400' slips in the direction of the outer surfaces 116', 126' of its side wall (cf. FIGS. 6 and 7), thus transverse to the axis A. To also prevent this very situation, the holders 400 and 400' each have a further first and a further second securing element from which in FIG. 5 only the passage 175, which has been described in connection with FIG. 1, on the holder 400 is shown.

Looking at FIG. 7 and imagining that the holder 400' also has such a passage 175' and that at the corner of the protrusion 180 of the holder 400, a latching nose 185 is arranged as previously described in connection with FIG. 4, then it is clear that the latching nose of the holder 400 engages with the passage of the holder 400' and latches at the edge inside the passage.

While the protrusion 180 engages behind the key 170' but ultimately only rests on the inner surfaces 111' and 121', the latching nose 185 on the protrusion 180 projects through the inner surfaces into the side walls and, in addition, latches at the edge inside the passage 175' of the holder 400'.

Thanks to these further securing elements 185 and 175', the two interconnected holders 400 and 400' are also secured against slipping transverse to the axis A or, respectively, along the side walls.

It is to be understood that more than two holders can be connected in this manner to form a row of virtually any length. Thus, for example, a further holder of the same embodiment could be connected to the holder 400 at the abutting surfaces 112 and 122 of the same. For this purpose, it would be necessary to first align the further holder corresponding to the holder 400 and to position it in such a manner that the groove of the protrusion of the further holder and the key 170 of the holder 400 oppose each other at an approximately uniform distance within a common plane. Subsequently, the further holder is to be moved along the angle bisector of the connection angle of the side walls towards the holder 400 until the intersection lines of the side walls of both holders finally lie in a common axis and the securing elements are completely engaged with each other. By reversing the movement, the further holder can be disengaged again from the holder 400; however, the latching nose of the further holder, which latching nose is latched at the edge inside the passage 175 of the holder 400, has first to be disengaged from its latching connection. How this can be done is illustrated in connection with FIG. 7.

However, FIG. 5 also shows that, for example, due to the second inner surface region 111b', 121b' outside of the gap 300', there is a certain additional distance between the gap 300' of the holder 400' and the gap 300 of the holder 400. If the corner region of a PV module 500 according to FIG. 3, which has a projection 510 in the form of a junction box on its back side, would be inserted into the gap 300', wherein the module's 500 front side, which later is facing the sun, points in the direction of the second securing element 180', then the junction box 510 would be allowed to maximally project from the back side of the module by an amount that corresponds to the width of the second inner surface region. If this would be ensured, there would be no risk that the junction box 510 could come in contact with a further adjacent PV module, which would be seated with a corner region in the gap 300 of the holder 400, arranged within the stack.

Figure 6:
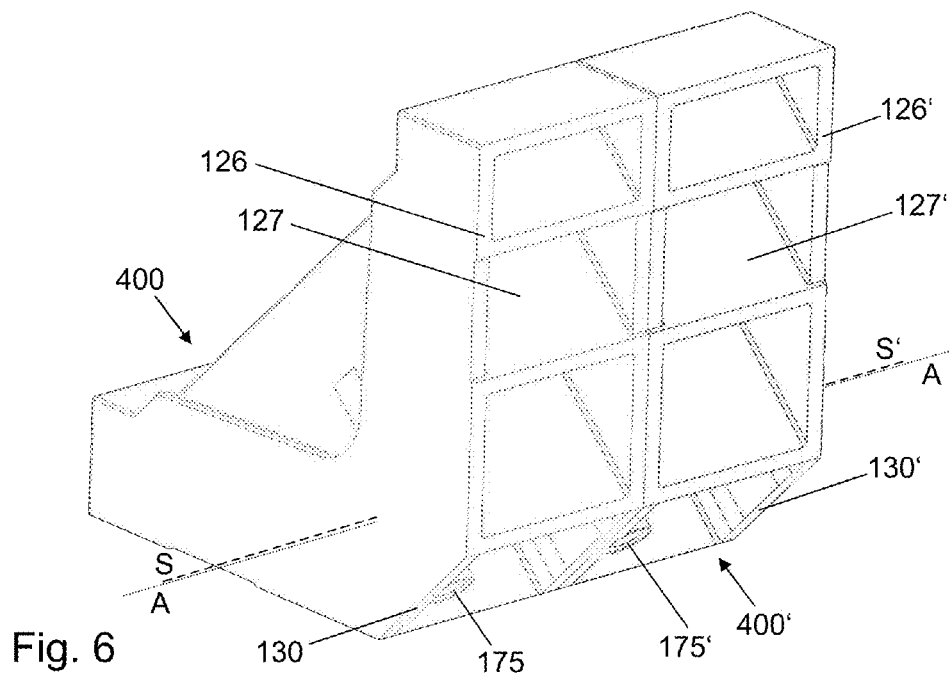
FIG. 6: shows the arrangement of the two interconnected holders according to FIG. 5, but rotated counterclockwise by 90 degrees about the common axis of the intersection lines of the side walls of the holders, in a spatial view at an angle onto the first abutting surfaces of the side walls of the one holder and onto one outer surface of each of the side walls of the two holders.

FIG. 6 shows the two interconnected holders 400 and 400' according to FIG. 5; however, the holders are now arranged rotated counterclockwise by 90 degrees about the common axis A of the intersection axes S and S' of their side walls. Therefore, the outer surfaces 126 and 126' of the second side walls are now visible in FIG. 6 which, in this embodiment of the holders, are open surfaces which show that the side walls are not solid, but, because of the reduced material requirement, are in fact hollow bodies, in the interior of which stiffening ribs 127 and 127' are integrally formed along the intersection line S and S', respectively, at the back onto the abutting surfaces and the inner surface.

Also, it is clearly visible now that in this embodiment of the holders 400 and 400', the outer surfaces of the side walls do not form an edge with an exterior angle of 270 degrees, but that this edge is chamfered so that a chamfer exists as additional surface 130 or, respectively, 130' which forms with each of the outer surfaces an edge with an exterior angle of 225 degrees. Both outer surfaces of the holders 400 and 400' as well as the surfaces 130 and 130' are shown in FIG. 7.

The passages 175 and 175' open out at the surfaces 130 and 130', which passages run along the angle bisector of the connection angles of the side walls of the holders 400 and 400' and which have a greater inside dimension at their opening at the surfaces 130 and 130' than at their other end. With respect to the interaction in particular of the passage 175' of the holder 400' with the latching nose of the holder 400, reference is made again to the FIG. 7.

Imagining that the two holders 400 and 400' of the arrangement according to FIG. 5 and the two holders 400 and 400' of the arrangement according to FIG. 6 stand facing each other on a horizontal underlayment, for example on a transport pallet, namely at a distance between the inner surfaces of the vertical side walls of the opposing holders 400 and 400 and, respectively, 400' and 400' which corresponds to the width of PV modules or other flat, cuboidal bodies such as flat glasses to be stored and/or to be transported, then, in principle, the first step is made for forming a stack of vertically aligned frameless PV modules or flat glasses, respectively, by means of the modular stacking system according to the invention.

In the context of this application and in particular hereinafter, a stack of frameless PV modules or other flat, cuboidal bodies which are not stacked in each case on top of each other in horizontal alignment, but are stacked side by side in each case in vertical alignment, thus with the side defining its thickness parallel to a horizontal underlayment, are also designated as cross stack. Thus, in this respect, frameless PV modules and also flat glasses are in particular stored or transported in a cross stack. It is to be understood here that each of the four corner regions of a PV module in a stack and also in a cross stack lies in each case in a common axis with the corresponding corner regions of the other PV modules in the stack or cross stack, respectively.

Assuming that 20 frameless PV modules are cross-stacked, then, beginning at the first abutting surfaces of the two opposing holders 400 and 400 and corresponding to the procedure described above, step by step, 18 further holders are to be applied in each case and to be connected to each other so that finally two rows each consisting of 20 holders stand facing each other at a uniform distance on the transport pallet.

After this first step of forming and placing two rows of holders on a horizontal underlayment, in a second step, the first PV module has to be brought in a vertical alignment, this means, the sides or, respectively, sides surfaces defining its thickness are to be aligned parallel to the two common axes in each of which the intersection lines of 20 holders of one of the two rows lie. It is substantially irrelevant here if the longest side or the second-longest side of the PV module is aligned parallel to the horizontal underlayment. The decisive factor is that the holders are spaced apart corresponding to the distance between the two lower corner regions. In a third step, the PV module can be vertically inserted from above with its two lower corner regions into the gaps of the two opposing holders which were the last to be connected to their respective row. In a fourth step, one further holder is to be attached in each case with its gap onto one of the two upper corner regions of the PV module. However, it is to be considered here that each of the first and second abutting surfaces or, respectively, securing elements of the two holders point at the upper corner regions of the PV module in the same direction as the ones of the two holders at the lower corner regions of the PV module.

For each of the other 19 PV modules, the steps two, three and four are to be repeated, wherein the fourth step always comprises connecting the further holders to the holders at the upper corner regions of the previous PV module. For this, the further holder is first to be aligned corresponding to the holder which is already present at the upper corner region of the previous PV module and to which it is to be connected. Then, the further holder is to be positioned such that the key of its first securing element and the groove of the protrusion of the second securing element of the present holder are opposing each other at an approximately uniform distance in a common plane. Subsequently, the further holder is to be moved along the angle bisector of the connection angle of the side walls towards the present holder until the intersection lines of the side walls of both holders finally lie in one common axis and the securing elements are completely engaged with each other.

The cross-stack with 20 modules is completed when finally also along the upper two corner regions of the individual PV modules, two rows each with 20 interconnected holders are created.

To dismantle the cross-stack, the previously described steps substantially have to be carried out simply in reverse order.

It is to be mentioned that with the modular stacking system according to the invention, basically, and in particular for storing, cross-stacks with any number of PV modules arranged therein can be built. With respect to transportability of a cross-stack, the latter can easily comprise 32 frameless PV modules, wherein in each individual case, the dimensions of the PV modules to be transported are to be considered.

Figure 7:
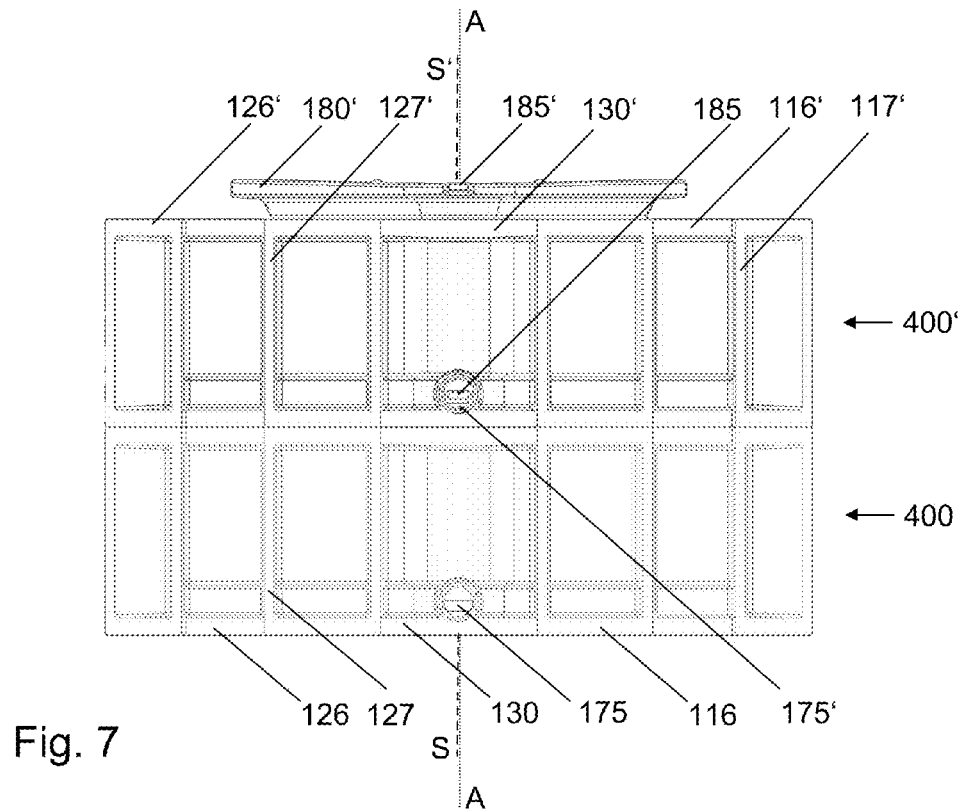
FIG. 7: shows the arrangement of the two interconnected holders according to FIG. 5 in a further spatial view with a viewing angle in each case of 45 degrees onto each of the outer surfaces of the side walls of the two holders.

FIG. 7 shows the two interconnected holders 400 and 400' according to the FIGS. 5 and 6 in a perspective which provides a vertical view onto the surfaces 130 and 130' and a viewing angle of 45 degrees onto each of the outer surfaces 116, 126, 116' and 126'.

Better illustrated than in the FIGS. 5 and 6 are here in particular the further first and second securing elements, thus, the passages 175 and 175' and the latching noses 185 and 185'; alone and also in interaction with each other.

Inside the passage 175, an edge is shown, wherein the passage 175 has a greater inside dimension in the section between its opening at the surface 130 and said edge than in the section behind the edge. In particular, the latter section is angular while the section between the opening at the surface 130 and the edges has a round shape.

Furthermore, FIG. 7 shows how the latching nose 185 of the holder 400 engages with the passage 175' of the holder 400' and latches at the edge inside the passage.

For separating the holders 400 and 400' from each other, it is necessary to penetrate from the opening at surface 130' with a finger or, depending on the inside dimension of the passage 175', with a suitable thin tool into the passage 175' and to bend the latching nose 185 back, namely far enough that its latching connection can be released. After this, the holder 400' can be moved with a movement along the angle bisector of the connection angle of its side walls and away from the holder 400 until the securing elements of both holders are not in engagement with each other anymore.

Figure 8:
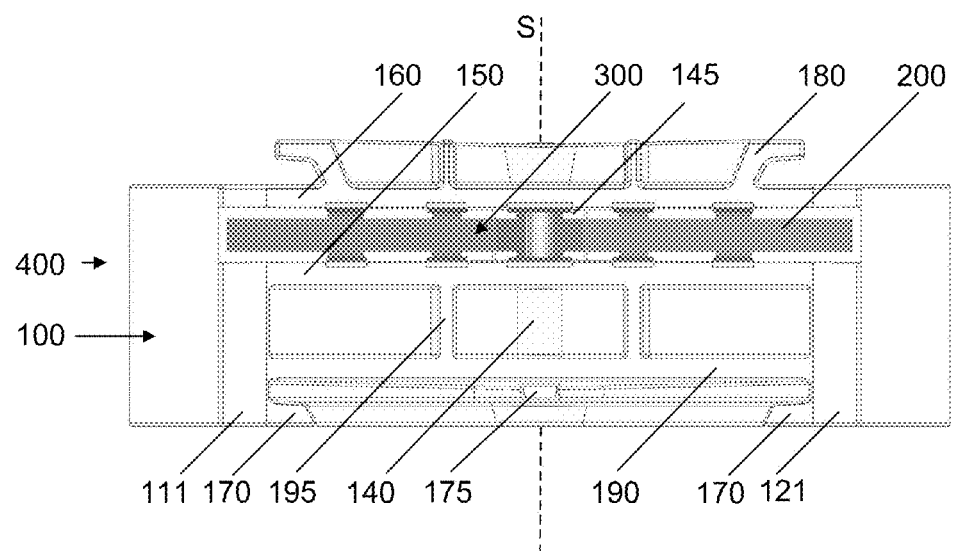
FIG. 8: shows the holder of the first embodiment according to FIG. 4 in a further spatial view with a viewing angle in each case of 45 degrees onto each of the inner surfaces of the side walls of the holder.

FIG. 8 shows the holder 400 of the first embodiment according to FIG. 4 in a perspective which provides a viewing angle of 45 degrees onto each of the inner surfaces 111 and 121 with their first and second inner surface regions 111*a*, 111*b* and 121*a*, 121*b*.

In FIG. 8 is clearly shown that the inner surfaces in the second inner surface region 111*b*, 121*b* does not form an angular edge, but a rounded edge 140. The inner surfaces in the first inner surface region 111*a*, 121*a* which lies within the gap 300, even form a curvature 145 which corresponds to the curvature of the buffer structure 200 as it has been described in connection with the FIGS. 2 and 3.

Further, also the passage 175 is clearly visible again, which passage lies directly in the rounded edge 140 of the inner surfaces in the second inner surface region 111*b*, 121*b* and extends along the angle bisector of the connection angle of the side walls passing through the side walls up to the opening at the chamfer 130 (cf. FIGS. 6 and 7).

Figures 9, 10:
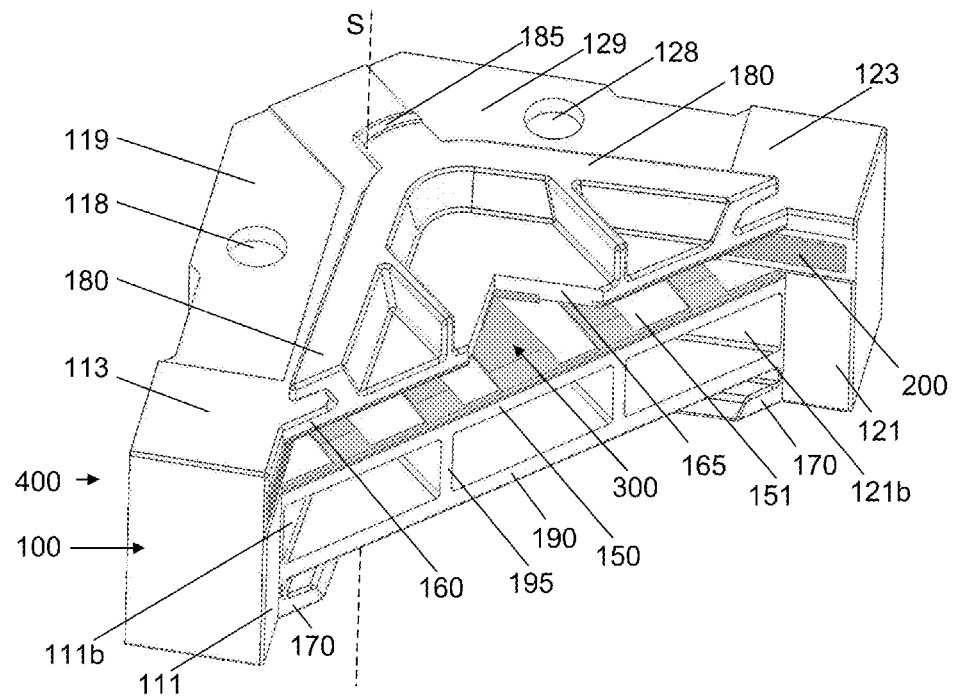
FIG. 9: shows a second embodiment of the holder with a base body and a buffer structure in a spatial view at an angle onto the two abutting surfaces of the two side walls of the holder.
FIG. 10: shows an arrangement of a holder of the second embodiment according to FIG. 9 mounted on a carrier profile in a spatial view at an angle onto the second abutting surfaces of the two side walls and the outer surface of the first side wall of the holder.

FIG. 9 shows a second and particularly preferred embodiment of the holder 400 with a base body 100 and a buffer structure 200 which corresponds substantially to the first embodiment of the holder. However, at least six differences between both embodiments are described hereinafter.

In this second embodiment of the holder 400 too, the buffer structure 200 is injection-molded as soft plastic onto the surfaces enclosing the gap 300, wherein said surfaces of the base body 100 have recesses where the buffer structure 200 is injection-molded. Compared to the first embodiment, however, the wall surfaces of the support elements 150 and 160 have an additional, although very narrow recess along the opposing edges which border the entrance of the gap 300. There too is one narrow strip, respectively, of the buffer structure 200 which connects the flattened ends of the five other strips. Thus, according to the second embodiment, the buffer structure 200 can provide its cushion effect also at those edges which, according to the first embodiment, would have been uncushioned at least in certain sections.

Also, when looking at the wall of the second support element 160, it is apparent that said wall has a notch 165 in the middle of that edge which lies at the entrance opening of the gap 300. The advantage resulting from said notch 165 is illustrated in connection with the FIG. 12.

Furthermore, in case of the holder 400 according to the second embodiment, the further second securing element 185, that is, the latching nose or, respectively, the latching clip, is formed larger and stronger than in the first embodiment. On the one hand, said latching clip can secure interconnected holders 400 of the second embodiment even better against slipping transverse to the common axis of their intersection lines or, respectively, along their side walls. On the other hand, said latching clip can be easier disengaged again when it is latched in the passage of a connected further holder. However, the passage, which is also formed differently in holders of the second embodiment, contributes to this as well. Since the passage of the holder 400 is not shown in FIG. 9, the same is addressed again in connection with the FIG. 11.

Two further obvious differences of the holder 400 of the second embodiment with respect to the first embodiment are the recesses or indentations 119 and 129 and the cut-outs 118 and 128 at the second abutting surfaces. Thanks to these features, the holder 400 is not only suitable for storing and transporting of framed and frameless PV modules, but, in addition, also for mounting of PV modules at the installation site by means of screwing through the cut-outs 118 and 128 or clamping by means of clamping devices which are applied at the recesses 119 and 129 of the abutting surfaces.

FIG. 10 shows the holder 400 of the second embodiment according to FIG. 9 which holder is mounted by means of a hat profile 620 onto the section of a carrier profile 610.

The holder 400 rests with its first abutting surfaces on the carrier profile 610 and is pressed by the hat profile 620 against the carrier profile 610. The hat profile 620 rests with its web 623 against the outer surface 116 of the first side wall of the holder 400. At the upper end of the web 623, the fold or rim 621 encompasses the second abutting surface 113 of the first side wall of the holder 400 exactly where the abutting surface 113 has the recess 119. At the lower end of the web 623, the hat profile 620 is screwed with its section 625 to the carrier profile 610.

Instead of using the hat profile 620, the clamping of the holder 400 onto the carrier profile 610 would also be possible with a Z-section. However, the advantage of the hat profile 620 with respect to a Z-section is that the hat profile, with its further fold 622 at the upper end of its further web 624, could clamp at the same time another second holder, such as the holder 400, onto the carrier profile 610.

Figure 11:
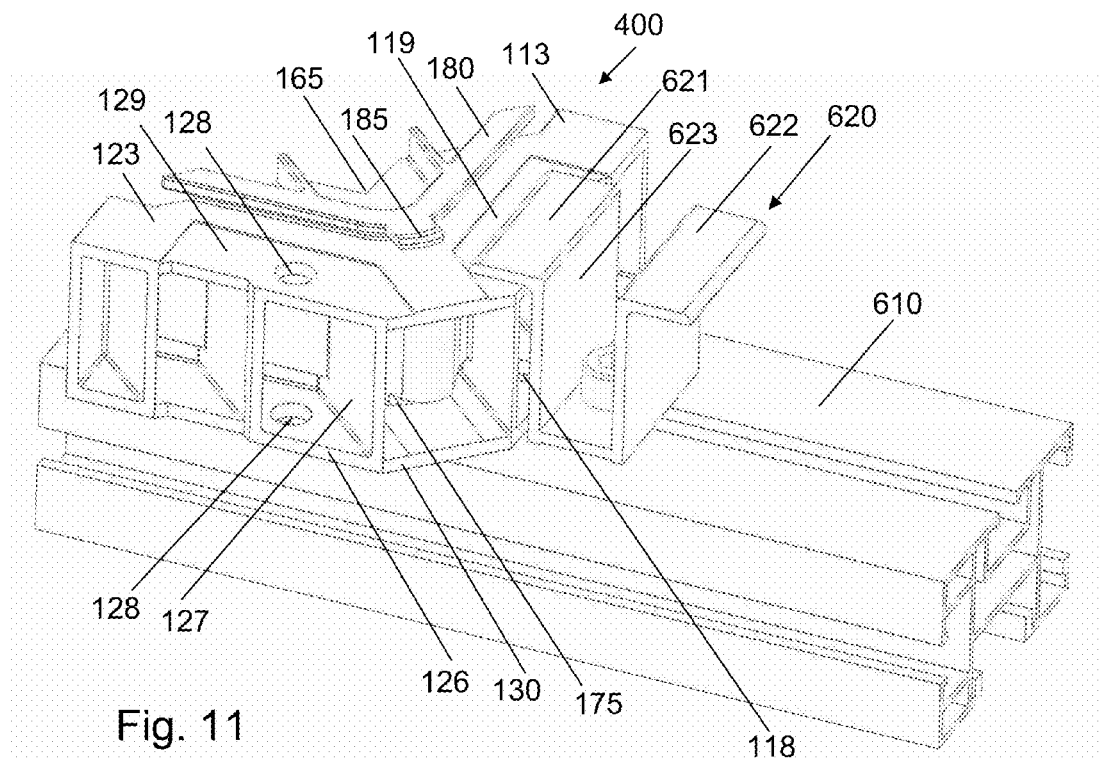
FIG. 11: shows the arrangement according to FIG. 10 in a further spatial view at an angle onto the second abutting surfaces and the outer surfaces of the two side walls of the holder.

FIG. 11 shows the holder 400 of the second embodiment mounted on the section of a carrier profile 610 according to FIG. 10 from a perspective which makes visible that in this embodiment of the holder 400, the passage 175 only runs through the rounded edge 140 of the inner surfaces in the second inner surface region 111b, 121b, but not anymore up to the surface 130. A further holder's latching nose 185 engaging with the passage 175 would simply latch at the back side of the rounded edge 140 where the passage 175 already ends and could also be released again in the same simple manner from the latching connection by finger pressure and without any further tool.

Furthermore, it is shown that the recesses 119 and 129 can only be found at the second abutting surfaces 113 and 123 while the round cut-outs 118 and 128 run through the second as well as through the first abutting surfaces. Through these cut-outs, the holder 400 can also be screwed directly, for example, to an underlayment made of wood.

FIG. 12 shows again the holder 400 of the second embodiment mounted on a section of a carrier profile 610 according to FIG. 10, wherein now a frameless PV module 500, which is illustrated only schematically and not completely, is seated with one of its corner regions in the gap 300 of the holder 400.

With three further holders such as the holder 400 arranged on the other three, non-illustrated corner regions of the module 500, the latter can be mounted in a simple manner at the installation site, for example on a roof, wherein conveniently, the same holders can be used for mounting in which the PV module 500 was delivered in a cross stack together with further modules.

Figure 12:
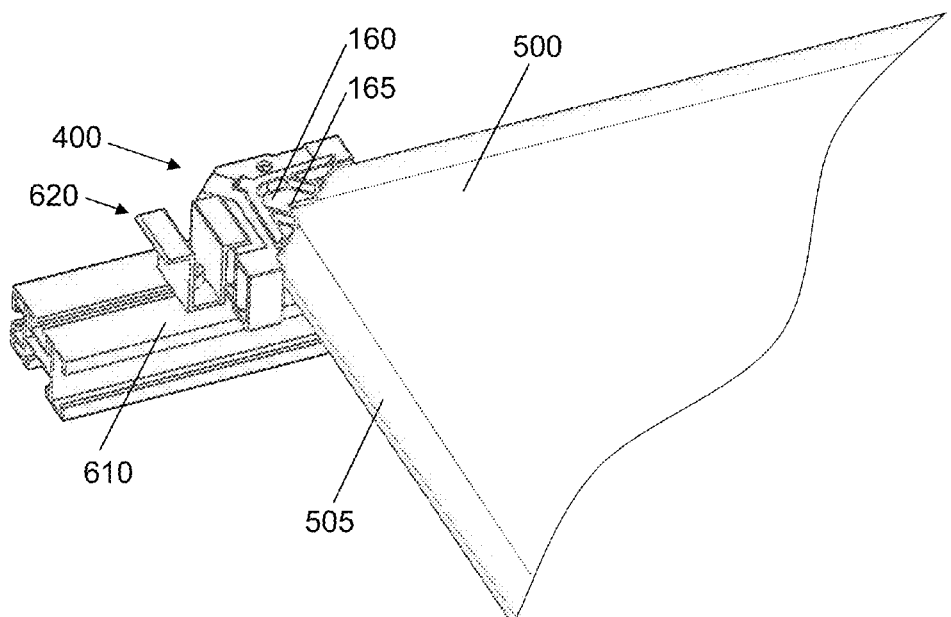
FIG. 12: shows the arrangement according to FIG. 10, wherein the holder has received a corner region section of a frameless PV module, in a spatial view at an angle onto the second abutting surfaces of the two side walls of the holder.

The dashed lines in FIG. 12 are intended to illustrate the photovoltaically inactive border region 505 of the PV module 500. Said substantially manufacturing related border region 505 does not contribute to the conversion of light into electric current.

The wall of the second support element 160 involved in the formation of the gap 300 of the holder 400, due to its triangular shape, would not only cover portions of the inactive border region 505, but also a portion, although a very small one, of the photovoltaically active area of the PV module. However, to avoid this, the wall of the support element 160 has a clearance in the form of the already mentioned notch 165. Thus, the performance capability of a PV module 500 with holders 400 arranged on its corner regions is not affected.

Figure 13:
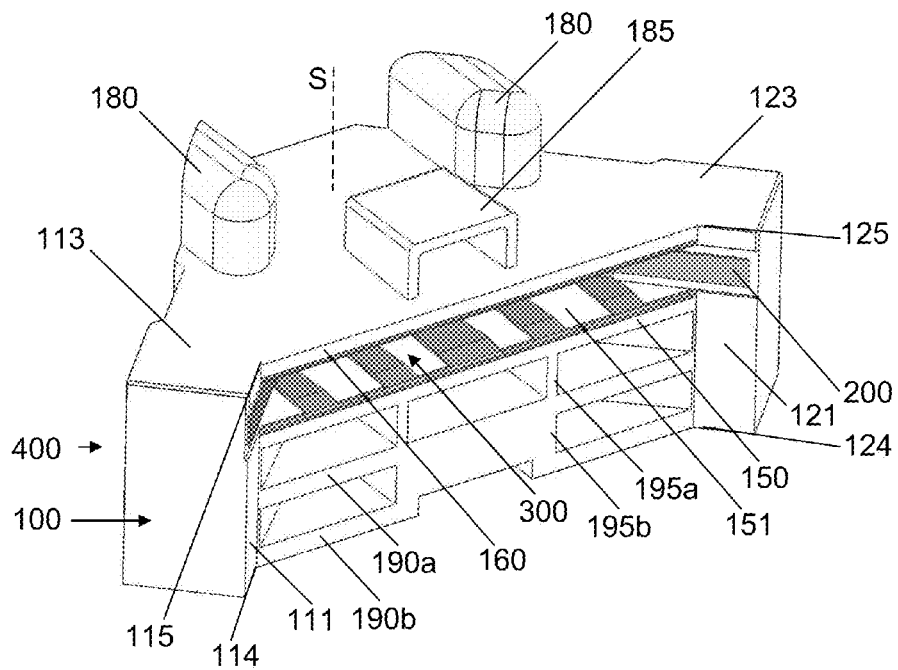
FIG. 13: shows a third embodiment of the holder with a base body and a buffer structure in a spatial view at an angle onto the second abutting surfaces of the two side walls and at an angle onto the support elements of the holder.

FIG. 13 shows a third preferred embodiment of the holder 400 with a base body 100 and a buffer structure 200. The buffer structure 200 in this embodiment corresponds substantially to the one according to the second embodiment of the holder 400. The base body 100 according to said third embodiment, however, differs significantly from the first as well as the second embodiment of the holder 400, namely primarily with respect to the securing elements and with respect to the support elements.

Thus, the base body 100 has four support elements which each are integrally formed onto the two inner surfaces 111 and 121 and thus each form a triangular wall. Besides the first and second support elements 150 and 160, which together are involved in the formation of the gap 300, additionally, a third and a fourth support element 190a and 190b are present, namely along the intersection line S spaced apart from each other and spaced apart from the first support element 150. By means of support ribs 195b running along the intersection line S, the fourth support element is connected to the third support element which in turn is connected by means of support ribs 195a, which also run along the intersection line S, to the first support element 150.

Due to the perspective on the holder 400 provided in FIG. 13, only the holder's second securing elements 180 and 185 are visible which are configured in the form of a pin 180 and a further pin 185. The first securing elements 170 and 175 which are not shown in this figure and which each are formed to fit oppositely, are described hereinafter in connection with FIG. 14, and the interaction of the first and second securing elements with the holders of the third embodiment connected to each other are described in connection with the FIGS. 15 and 16.

Analog to the second support element 160 which, in the same manner as in the two previously described embodiments of the holder 400, is integrally formed directly along the second borders 115 and 125 onto the inner surfaces 111 and 121, the fourth support element 190b, which exists in the third embodiment, is integrally formed directly along the first borders 114 and 124 into the inner surfaces 111 and 121. Due to the second support element 160 being flush with the second abutting surfaces 113 and 123 and the fourth support element 190b being flush with the first abutting surfaces 112 and 122 of the side walls 110 and 120, the support elements 160 and 190b contribute to the increase of the respective abutting surfaces. The resulting additional space on the first and second abutting surfaces is utilized in said third embodiment of the holder 400 to position a further second securing element 185 thereon or, respectively, a further first securing element 175 which, as already mentioned, is not shown in the FIG. 13.

Figure 14:
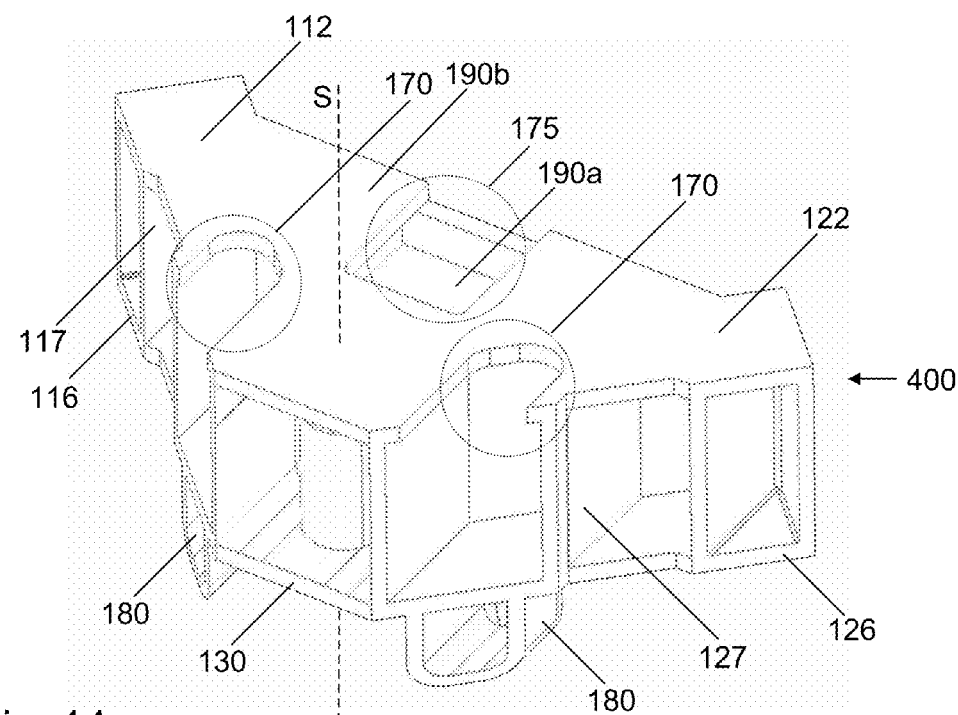
FIG. 14: shows a holder of the third embodiment according to FIG. 13 in a spatial view at an angle onto the first abutting surfaces and the outer surfaces of the two side walls of the holder.

FIG. 14 shows the holder 400 of the third embodiment according to FIG. 13, but from a different perspective so that now the first abutting surfaces 112 and 122 and thus also the first securing elements are visible which are configured in the form of two open cavities 170—oppositely fitting for the pin 180—and a further open cavity 175—oppositely fitting for the pin 185.

Furthermore, FIG. 14 shows the outer surfaces 116 and 126 of the side walls 110 and 120 which, as in the previously described first and second embodiments of the holder 400 are also not closed, wherein also the side walls of the holder 400 according to the third embodiment are not solid but are configured as hollow bodies with support ribs 117 and 127 running along the intersection line S between the first and second abutting surfaces.

By utilizing the configuration of the side walls as hollow body, the two open cavities 170 are formed in such a manner that each of the first abutting surfaces 112 and 122 has an opening which corresponds to the position and the shape of one of the pins 180.

Furthermore, analog to the further pin 185 formed on the side of the second abutting surfaces 113 and 123 on the wall surface of the second support element 160, the further securing element 175 is formed in the form of a further open cavity on the side of the first abutting surfaces 112 and 122 on the wall surface of the fourth supporting element 190b, namely in such a manner that it fits correspondingly with respect to the position and the shape of the opening for the pin 185. Here, the depth of the further open cavity 175 is defined by the wall formed by the third support element 190a.

Figure 15:
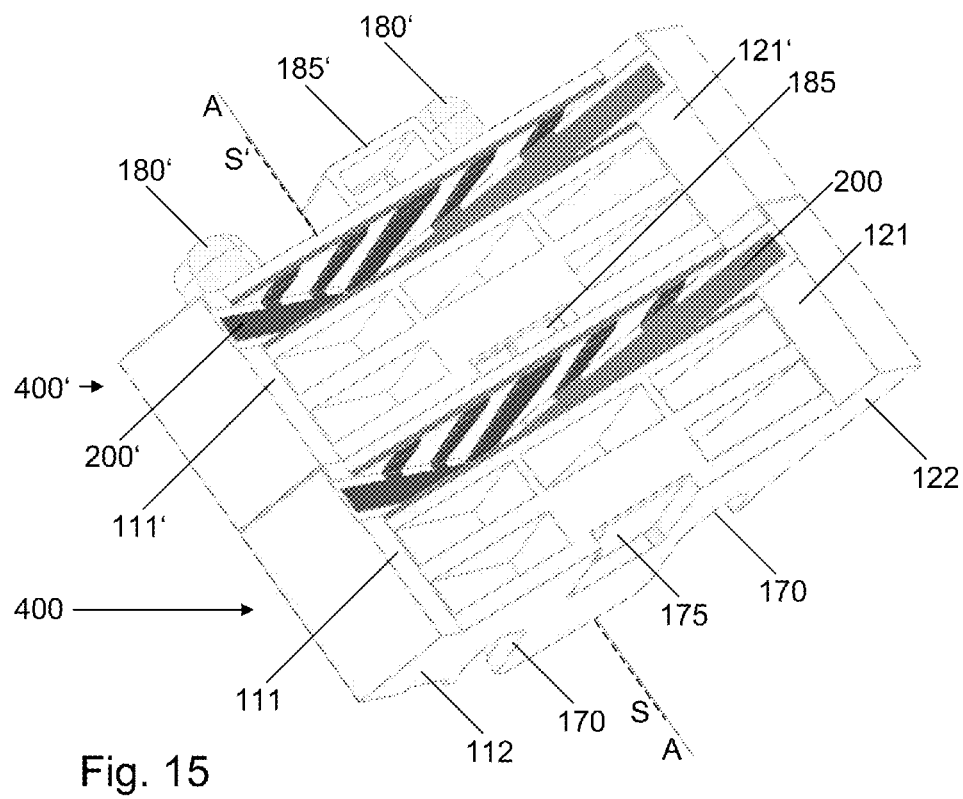
FIG. 15: shows an arrangement of two interconnected holders of the third embodiment according to FIG. 13 in a spatial view at an angle onto the support elements of the two holders.
Figure 16:
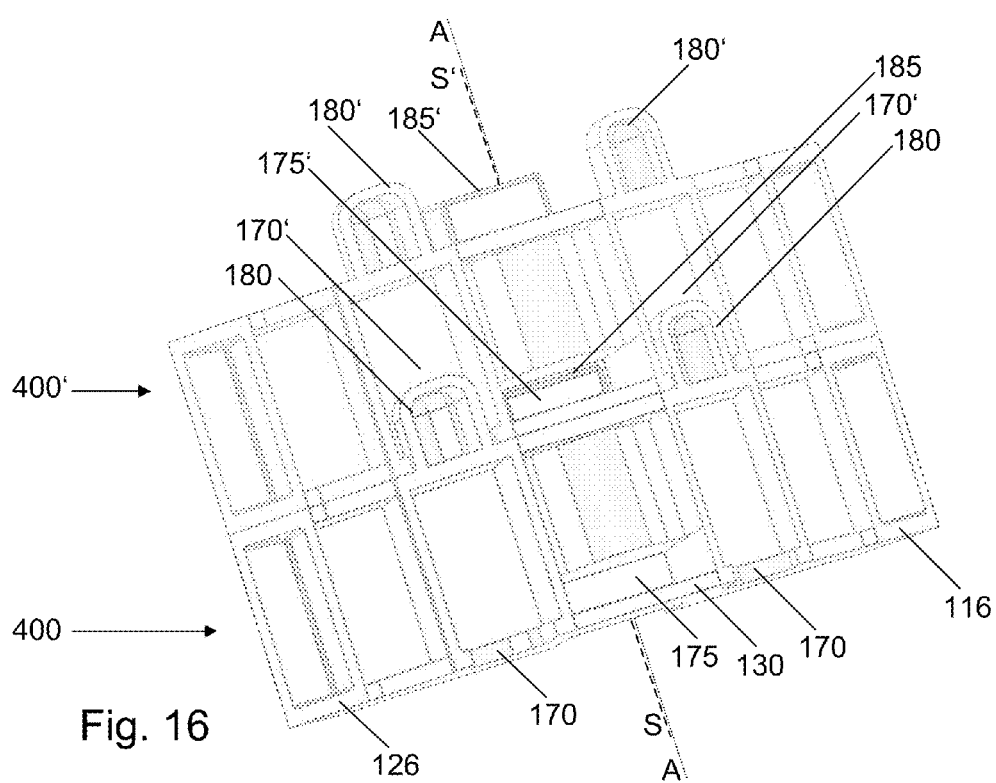
FIG. 16: shows the arrangement of the two interconnected holders according to FIG. 15 in a further spatial view at an angle onto the outer surfaces of the side walls of the two holders.
Figure 17:
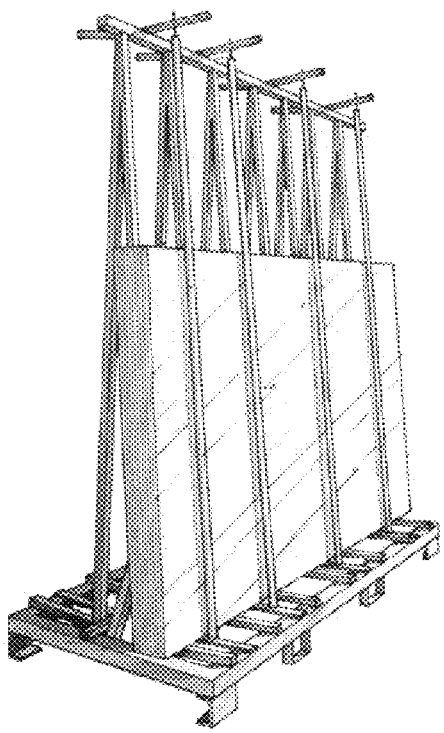
FIG. 17: shows a schematic illustration of a shelf construction according to the prior art for storing and/or transporting flat glasses.
Figure 18:
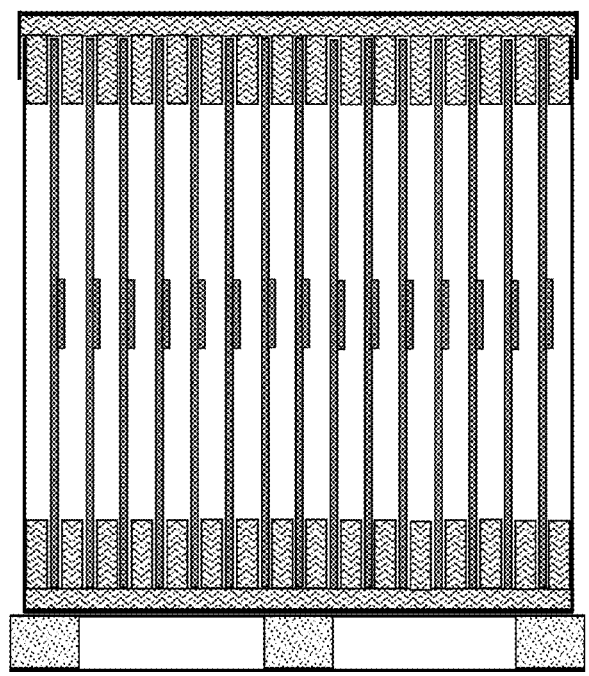
FIG. 18: shows a schematic illustration of a cardboard box according to the prior art for storing and/or transporting vertically aligned frameless PV modules.
Figure 19:
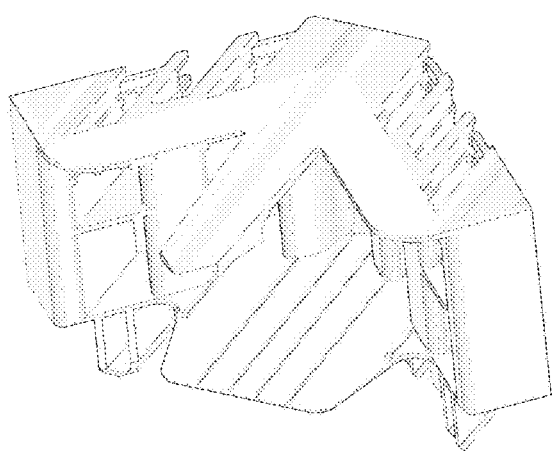
FIG. 19: shows a molding member of a modular plug-in system for stacking PV modules according to the prior art.
Figure 20:
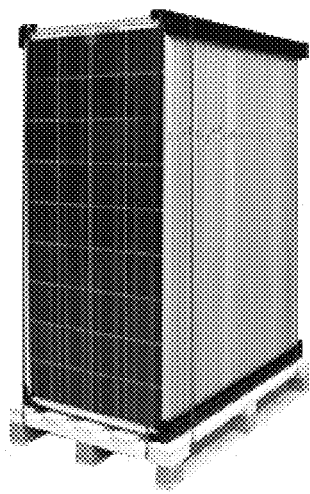
FIG. 20: shows a stack of a plurality of vertically aligned framed PV modules on a pallet, which stack was formed by means of a plurality of molding members according to FIG. 14, FIG. 21: shows an enlarged view of the upper right edge of the stack according to FIG. 15.
Figure 21:
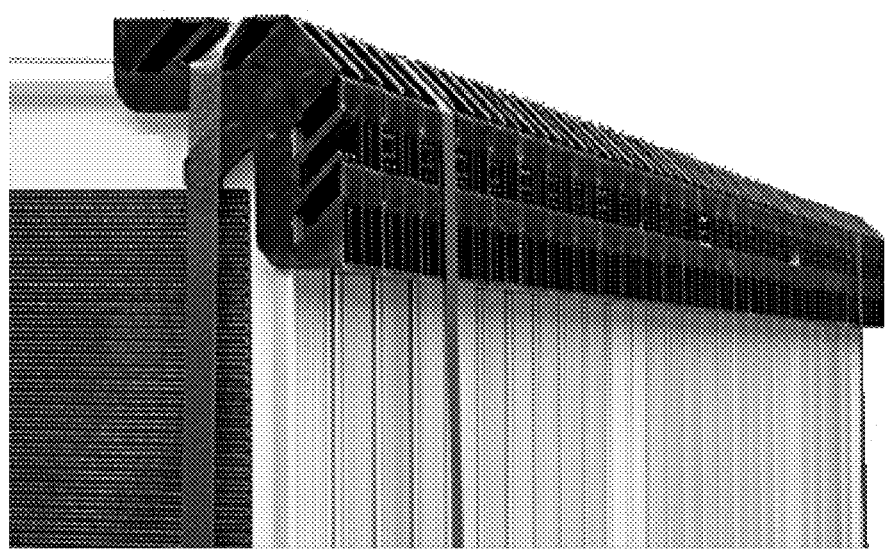

However, as it is apparent from the further FIGS. 15 and 16, all open cavities serving as securing elements are deep enough to be able to completely receive therein the mating securing elements configured as pins of a further similar holder when connecting the holders to each other or when the holders are connected to each other.

The FIGS. 15 and 16 show an arrangement of two interconnected holders 400 and 400' of the third embodiment according to FIGS. 13 and 14, wherein FIG. 15 provides a perspective in which the support elements and the buffer structure of each holder are visible, while in the perspective of FIG. 16, the outer surfaces of the side walls of the two interconnected holders are visible.

It is in particular apparent from the FIGS. 15 and 16 that the second abutting surfaces of the holder 400 contact the first abutting surfaces of the holder 400' and that the pins 180 and 185 of the holder 400 are fittingly inserted in the respective open cavities 170' and 175' of the holder 400'.

The fact that the entrance openings of the open cavities 170, 175 or, respectively, 170', 175' do not have a completely closed circumference is a result of the manufacturing process of the holders of this embodiment. The base bodies of the holders of the third embodiment consist of a hard plastic and are produced in an injection molding process with a two-part injection molding tool, the two parts of which can be separated in one plane only. Entrance openings with a closed circumference and positioned in the middle of the respective abutting surface thus would mean an undercut which can not be implemented with such a simple and inexpensive manufacturing method because the one parting plane of the injection molding tool runs parallel to the abutting surfaces of the side walls.

Nevertheless, the first and the fittingly formed second securing elements on the opposite side secure the interconnected holders 400, 400' of the third embodiment against slipping transverse to the common axis A of their intersection lines S, S' because the first securing elements 170, 175 and 170', 175' are formed in such a manner at the first abutting surfaces and the fourth support element's 190b wall surface which is flush with the first abutting surface, that the circumference of the entrance openings of the first securing elements 170 and 170' is interrupted at the edge to the respective outer surface 116, 126 and 116', 126', respectively, while the interruption in the circumference of the entrance opening of the further first securing element 175 or, respectively, 175' points in fact in the opposite direction.

An advantage of this embodiment of the holder 400 with its first and second securing elements basing on a relatively simple plug-in mechanism is that cross stacks of frameless PV modules can be generated therewith also in an automated manner, wherein the stacking systems have to carry out steps similar to the ones necessary when generating cross stacks of framed PV modules.

First, a holder 400 is attached to all four corner regions of a first frameless PV module so that a section of each corner region is seated in the gap 300 of one of the four holders 400. After this, the first PV module is set down in horizontal alignment on a suitable receiving device of the system, wherein only the first abutting surfaces of the holders 400 come in contact with the receiving device, but not the PV module itself. Then, on a second frameless PV module, one holder 400 of further four holders 400 is attached to each of the four corner regions so that a section of each corner region of the PV module is seated in the gap 300 of one of the four further holders 400. After this, the second PV module is lowered from above in horizontal alignment onto the PV module already placed on the receiving device until the second securing elements, that is, the pins, of the holders on the first frameless PV module are completely received in the first securing elements, thus the open cavities of the holders on the second PV module and the abutting surfaces of both PV modules come in contact with each other or, respectively, the further holders of the second PV module rest on the holders of the first PV module. The intersection lines of interconnected holders lie again in a common axis. For each further frameless PV module of the cross stack to be formed, the steps described above for the second PV module are to be repeated. Once the desired number of PV modules to be stacked is reached, thus, for example, 25, the stack is provided with circumferential tensioning straps to prevent in particular a slipping of the holders along the common axis of the intersection lines. Subsequently, the entire stack is tilted with the support of the receiving device or a further tiltable device by 90 degrees so that the 25 frameless PV modules are now aligned vertically within the stack and the cross stack created in this manner is set down onto a different horizontal underlayment, for example, a transport pallet.

However, the holders can also be used with stacking systems which are configured to build a stack in such a manner that the second PV module, after it has been provided with further holders at its corner regions, is moved from below towards the first PV module already placed in the receiving device until the second securing elements, that is, the pins, of the further holders on the second PV module are completely received in the first securing elements, thus, the open cavities, of the holders on the first PV module and the abutting surfaces of the holders of both PV modules come in contact with each other or, respectively, the holders of the first PV module rest on the further holders of the second PV module. For each further frameless PV module, the steps described above for the second PV module are to be repeated until the desired number of PV modules to be stacked is reached, whereupon the stack is provided with circumferential tensioning straps and is tilted by means of the tiltable receiving device or a further tiltable device of the system by 90 degrees so that the PV modules within the stack are vertically aligned and the cross-stack created in this manner can finally be set down onto a horizontal underlayment such as a transport pallet.

The invention claimed is:

1. A holder (400) for safely storing and/or transporting frameless PV modules or other flat, cuboidal bodies (500), the size of which is defined by three sides and the thickness of which is defined by the shortest one of the three sides, comprising:
   a) a base body (100) made from a first material, with
      i) a first side wall (110) that is connected along an intersection line (S) to a second side wall (120) so that a wedge-like shape of the base body (100) is defined,
      wherein each of the side walls (110; 120) has an inner surface (111; 121) that extends in each case along the intersection line (S) between a first border (114; 124) that is perpendicular to the intersection line (S) and a second border (115; 125) that is perpendicular to the intersection line (S),
      wherein between the inner surfaces (111; 121) of the side walls (110; 120), a right angle exists,
      and wherein each of the side walls (110; 120) has a first abutting surface (112; 122) that forms, at the first border (114; 124), a first edge with the inner surface (111; 121), and has a second abutting surface (113; 123) that forms, at the second border (115; 125), a second edge with the inner surface (111; 121);
      ii) at least one first support element (150) and spaced apart therefrom along the intersection line (S), at least one second support element (160),
      wherein the support elements (150, 160) are integrally formed onto the inner surface (111; 121) of at least one of the side walls (110; 120),
      wherein by the at least one first support element (150) and the at least one second support element (160) and a first inner surface region (111*a*, 121*a*) that extends between the first and second support elements (150, 160) over the inner surface (111; 121) of at least one of the side walls (110, 120), a gap (300) is formed;
      iii) at least one first securing element (170) that acts on the side of the first abutting surfaces (112, 122) and at least one second securing element (180) that is formed to oppositely fit to the first securing element (170) and that acts on the side of the second abutting surfaces (113, 123),
      wherein on the side of the first abutting surfaces (112, 122) and on the side of the second abutting surfaces (113, 123), the holder (400) is detachably connectable in each case to a correspondingly aligned further holder (400') in such a manner that the intersection lines (S; S') of the holders (400; 400') lie in one common axis (A),
      wherein the at least one first and the at least one second securing element (170, 180) of the holder (400) are configured in such a manner that, by interacting with the respective oppositely fitting securing element (170', 180') of the further holder (400'), they secure the connected holders (400, 400') against slipping transverse to the common axis (A) and/or against slipping along the common axis (A); and further comprising
   b) a buffer structure (200) made from a second material that is softer with respect to the first material and that has an adhering effect,
      wherein the buffer structure (200) is applied onto the first inner surface region (111*a*, 121*a*) and in each case onto that surface (151; 161) of the at least one support element (150) and the at least one second support element (160) that faces the gap (300),
      wherein the gap (300) is configured to receive a corner region section of a flat, cuboidal body (500) to be stored and/or to be transported that is, with the side defining its thickness, aligned parallel to the intersection line (S),
      and wherein the buffer structure (200) is configured to cushion and to fix the corner region section of the flat, cuboidal body (500) in the gap (300) prevented that the thickness of the flat, cuboidal body (500) corresponds substantially to the width of the gap (300).

2. The holder (400) according to claim 1,
   wherein the first material of the base body (100) is a hard plastic or a metal, in particular die-cast aluminum,
   and/or wherein the second material of the buffer structure (200) is a soft plastic.

3. The holder (400) according to claim 1,
   wherein the buffer structure (200) is injection-molded in each case onto that surface (151; 161) of the at least one first support element (150) and the at least one second support element (160) that faces the gap (300), as well as onto the first inner surface region (111*a*, 121*a*)
   or wherein the buffer structure (200) is a separate body and can be inserted, glued or clipped into the gap (300).

4. The holder (400) according to claim 1,
   wherein the at least one first securing element (170) or, respectively, the at least one second securing element (180) is formed as pin or as key,
   and wherein the at least one second securing element (180) or, respectively, the at least one first securing element (170) is formed as open cavity for fittingly receiving the pin of a correspondingly aligned further holder (400') or as groove for fittingly receiving the key of a correspondingly aligned further holder (400').

5. The holder (400) according to claim 4,
   wherein the pin or the key is formed on at least one first abutting surface (112, 122) or, respectively, on at least one second abutting surface (113, 123),
   and wherein the open cavity or the groove is formed on at least one second abutting surface (113, 123) or, respectively, on at least one first abutting surface (112, 122).

6. The holder (400) according to claim 4,
   wherein the key is formed along at least one of the first edges or, respectively, along at least one of the second edges on at least one of the inner surfaces (111, 121),
   and wherein the groove is formed by a protrusion that is formed along at least one of the second edges or, respectively, at least one of the first edges on at least one of the inner surfaces (111, 121).

7. The holder (400) according to claim 1, wherein at least one of the support elements (150, 160) is integrally formed onto the inner surfaces (111, 121) of both side walls (110, 120).

8. The holder (400) according to claim 7, wherein the at least one support element (150, 160) forms an open or closed triangular wall between the inner surfaces (111, 121) of the side walls (110, 120).

9. The holder (400) according to claim 1, wherein the first borders (114, 124) are spaced apart from the second borders (115, 125) in such a manner along the intersection line (S) that the inner surfaces (111, 121) are wider than the width of the gap (300) and thus have a second inner surface region (111b, 121b) outside of the gap (300).

10. The holder according to claim 1, wherein at least one of the side walls (110, 120) has at least one cut-out (118, 128) between the first abutting surface (112, 122) and the second abutting surface (113, 123).

11. A modular stacking system for safely storing and/transporting frameless PV modules or other flat, cuboidal bodies (500), comprising at least one first, at least one second, at least one third and at least one fourth holder (400) according to claim 1,
wherein the second holder with respect to the first holder, the third holder with respect to the second holder, and the fourth holder with respect to the third holder are arrangable in each case such that they are rotated by 90 degrees about the axis (A) of their intersection line (S) in order to be able to receive a section of one of the four corner regions of a flat, cuboidal body (500) to be stored and/or to be transported in the gap (300) of each holder, and wherein the at least one first, the at least one second, the at least one third and the at least one fourth holder (400) are detachably connectable to correspondingly aligned first, second, third and fourth holders (400') such that the intersection lines (S, S') of all first, second, third and fourth holders each lie in one common axis (A) and that by the interaction of their first and second securing elements (170, 180; 170', 180'), each of the connected holders are secured against a slipping transverse to the common axis (A) and/or against a slipping along the common axis.

12. The modular stacking system according to claim 11,
wherein the at least one first holder, with the outer surface (116) of its first side wall (110), and the at least one second holder, with the outer surface (126) of its second side wall (120), are arrangable on a horizontal underlayment in such a manner that the flat, cuboidal body (500) to be stored and/or to be transported is aligned such that the side defining its thickness is parallel to the horizontal underlayment.

13. A buffer structure (200) for a holder (400) according to claim 1,
wherein the buffer structure (200) consists of a material that is softer with respect to the material of the base body (100) and that has an adhering effect,
wherein the buffer structure (200) can be applied onto the first inner surface region (111a, 121a) and in each case onto that surface (151; 161) of the at least one first support element (150) and the at least one second support element (160) of the holder (400) that faces the gap (300),
and wherein the buffer structure (200) is configured to cushion and fix the corner region section of a flat, cuboidal body (500) in the gap (300) of the holder (400).

14. The buffer structure (200) according to claim 13,
wherein the buffer structure (200) is a separate body and can be inserted, glued, latched or clipped into the gap (300) of the base body (100) of the holder (400).

* * * * *